(12) United States Patent
Kobayashi et al.

(10) Patent No.: US 7,911,478 B2
(45) Date of Patent: Mar. 22, 2011

(54) DRAWING DEVICE, DRAWING METHOD, AND DRAWING PROGRAM

(75) Inventors: Tadashi Kobayashi, Osaka (JP); Akio Nishimura, Osaka (JP); Yoshiyuki Mochizuki, Osaka (JP)

(73) Assignee: Panasonic Corporation, Osaka (JP)

( * ) Notice: Subject to any disclaimer, the term of this patent is extended or adjusted under 35 U.S.C. 154(b) by 879 days.

(21) Appl. No.: 11/892,606

(22) Filed: Aug. 24, 2007

(65) Prior Publication Data

US 2008/0049041 A1    Feb. 28, 2008

(30) Foreign Application Priority Data

Aug. 28, 2006    (JP) .................. 2006-231169

(51) Int. Cl.
| | |
|---|---|
| G06T 17/00 | (2006.01) |
| G06T 11/40 | (2006.01) |
| G09G 5/00 | (2006.01) |
| G06K 9/36 | (2006.01) |
| G06K 9/32 | (2006.01) |
| G06K 9/40 | (2006.01) |

(52) U.S. Cl. ........ 345/584; 345/428; 345/587; 345/606; 345/552; 382/232; 382/248; 382/254; 382/300

(58) Field of Classification Search ............... 382/274, 382/276, 232–233, 248, 254, 300, 305; 708/204–206, 400, 490; 345/418–420, 423, 345/428, 581–587, 606, 639, 643, 501, 552, 345/555

See application file for complete search history.

(56) References Cited

U.S. PATENT DOCUMENTS

| | | | |
|---|---|---|---|
| 6,741,739 B1* | 5/2004 | Vincent | 382/191 |
| 6,937,659 B1* | 8/2005 | Nguyen et al. | 375/240.19 |
| 2002/0159644 A1* | 10/2002 | Sakuyama | 382/240 |
| 2003/0086623 A1* | 5/2003 | Berkner et al. | 382/260 |
| 2003/0218776 A1* | 11/2003 | Morimoto et al. | 358/2.1 |

FOREIGN PATENT DOCUMENTS

| | | |
|---|---|---|
| JP | 07-230555 | 8/1995 |
| JP | 2001-126084 | 5/2001 |

OTHER PUBLICATIONS

Mason Woo, et al., "The Official Guide to Learning Opengl, Version 1.1", US, Addision-Wesley, 1997, pp. 338 and 339.

\* cited by examiner

*Primary Examiner* — Wesner Sajous
(74) *Attorney, Agent, or Firm* — Wenderoth, Lind & Ponack, L.L.P.

(57) ABSTRACT

A display device includes a wavelet transform unit for transforming an original image into wavelet coefficients using a Harr wavelet transform formula, a level obtaining unit for obtaining a mipmap level of a mipmap image. The display device also includes an inverse wavelet transform unit for receiving and subjecting at least a portion of the wavelet coefficients obtained by the transformation by the wavelet transform unit, to an inverse transform using an inverse Harr wavelet transform formula until an order having a value equal to the mipmap level is obtained, and outputting an image represented by at least a portion of a low-frequency component of wavelet coefficients having the order having the value equal to the mipmap level. Additionally, the display device includes a polygon drawing unit for drawing the image output by the inverse wavelet transform unit, as a mipmap image, on the polygon image.

14 Claims, 18 Drawing Sheets

FIG. 4

|    | U0 | U1 | U2 | U3 | U4 | U5 | U6 | U7 | U8 | U9 | U10 | U11 | U12 | U13 | U14 | U15 |
|----|----|----|----|----|----|----|----|----|----|----|-----|-----|-----|-----|-----|-----|
| V0 | 32 | 40 | 57 | 52 | 80 | 91 | 98 | 104 | 140 | 189 | 163 | 172 | 145 | 89 | 138 | 135 |
| V1 | 32 | 40 | 51 | 49 | 83 | 94 | 102 | 109 | 140 | 178 | 147 | 150 | 121 | 78 | 125 | 141 |
| V2 | 31 | 39 | 42 | 42 | 76 | 89 | 98 | 108 | 128 | 152 | 117 | 116 | 98 | 72 | 106 | 139 |
| V3 | 31 | 40 | 39 | 47 | 74 | 90 | 100 | 110 | 116 | 124 | 93 | 94 | 84 | 77 | 88 | 122 |
| V4 | 31 | 47 | 48 | 65 | 86 | 103 | 109 | 117 | 105 | 100 | 78 | 84 | 66 | 75 | 70 | 98 |
| V5 | 33 | 57 | 67 | 94 | 102 | 116 | 116 | 118 | 91 | 74 | 61 | 73 | 45 | 60 | 55 | 86 |
| V6 | 30 | 65 | 82 | 116 | 112 | 123 | 115 | 114 | 76 | 52 | 48 | 61 | 42 | 46 | 49 | 91 |
| V7 | 27 | 69 | 92 | 127 | 123 | 131 | 119 | 116 | 75 | 48 | 47 | 61 | 52 | 41 | 49 | 101 |
| V8 | 49 | 57 | 88 | 116 | 126 | 125 | 116 | 114 | 94 | 57 | 60 | 84 | 58 | 53 | 75 | 95 |
| V9 | 50 | 46 | 81 | 104 | 109 | 118 | 112 | 114 | 103 | 80 | 99 | 141 | 97 | 58 | 90 | 121 |
| V10 | 51 | 33 | 66 | 79 | 82 | 108 | 110 | 115 | 117 | 105 | 137 | 196 | 135 | 64 | 102 | 138 |
| V11 | 53 | 29 | 58 | 59 | 68 | 104 | 110 | 117 | 123 | 112 | 144 | 206 | 146 | 76 | 108 | 131 |
| V12 | 62 | 39 | 68 | 69 | 80 | 111 | 114 | 116 | 118 | 105 | 132 | 186 | 127 | 97 | 118 | 124 |
| V13 | 80 | 63 | 92 | 100 | 106 | 122 | 118 | 115 | 111 | 103 | 131 | 172 | 105 | 119 | 135 | 134 |
| V14 | 95 | 90 | 110 | 120 | 118 | 123 | 121 | 122 | 113 | 113 | 146 | 172 | 89 | 126 | 138 | 145 |
| V15 | 105 | 111 | 117 | 123 | 116 | 117 | 123 | 132 | 123 | 128 | 163 | 179 | 84 | 123 | 132 | 149 |

FIG. 5

| | U0 | U1 | U2 | U3 | U4 | U5 | U6 | U7 | U8 | U9 | U10 | U11 | U12 | U13 | U14 | U15 |
|---|---|---|---|---|---|---|---|---|---|---|---|---|---|---|---|---|
| V0 | 36 | 35 | 42 | 48 | 51 | 42 | 61 | 100 | 0 | 0 | -3 | 0 | 3 | 1 | -11 | -8 |
| V1 | 52 | 43 | 69 | 104 | 97 | 66 | 82 | 118 | 2 | -1 | -12 | -5 | 5 | 7 | -14 | -3 |
| V2 | 87 | 82 | 102 | 122 | 120 | 91 | 105 | 119 | -2 | 0 | -7 | -5 | 6 | 5 | -9 | 2 |
| V3 | 103 | 104 | 115 | 116 | 114 | 113 | 116 | 125 | -2 | -1 | -2 | -2 | 1 | -1 | -1 | -3 |
| V4 | 162 | 130 | 93 | 63 | 84 | 114 | 109 | 119 | 3 | 10 | 10 | 1 | -8 | -3 | 2 | -6 |
| V5 | 158 | 105 | 74 | 54 | 96 | 171 | 155 | 165 | 10 | 12 | 7 | 0 | -24 | -4 | 4 | -6 |
| V6 | 108 | 83 | 62 | 45 | 67 | 105 | 112 | 106 | 9 | 2 | 9 | -1 | -11 | -6 | 0 | 2 |
| V7 | 135 | 114 | 77 | 73 | 95 | 120 | 128 | 141 | 2 | 9 | 7 | -3 | -10 | 0 | -7 | 1 |
| V8 | -4 | -4 | -10 | -19 | -1 | 11 | 10 | 0 | 0 | 1 | 8 | 7 | -12 | -6 | 6 | 11 |
| V9 | 2 | -2 | -11 | -17 | -13 | -4 | -2 | -4 | 3 | 8 | 10 | 1 | -5 | -12 | 7 | -4 |
| V10 | -6 | -7 | -8 | -5 | -2 | -16 | -12 | -2 | 0 | 3 | -3 | -3 | 10 | 10 | -15 | -4 |
| V11 | -3 | -5 | -3 | 1 | 0 | -3 | 0 | -3 | 1 | 0 | -6 | -2 | 4 | 2 | -5 | 8 |
| V12 | -22 | -8 | 6 | 13 | 15 | 6 | 5 | -1 | -11 | -16 | -12 | -3 | 14 | 1 | 5 | 5 |
| V13 | -3 | 0 | -5 | -7 | -17 | -30 | -24 | -11 | -6 | 2 | 6 | 1 | 18 | 3 | -13 | -10 |
| V14 | 25 | 8 | -6 | 2 | 11 | 35 | 4 | -19 | 13 | 19 | 6 | -15 | -34 | 1 | 44 | 2 |
| V15 | -3 | -17 | -15 | -24 | -13 | -15 | -1 | -6 | 19 | 1 | 3 | 10 | 11 | -13 | -7 | 10 |

F I G. 9
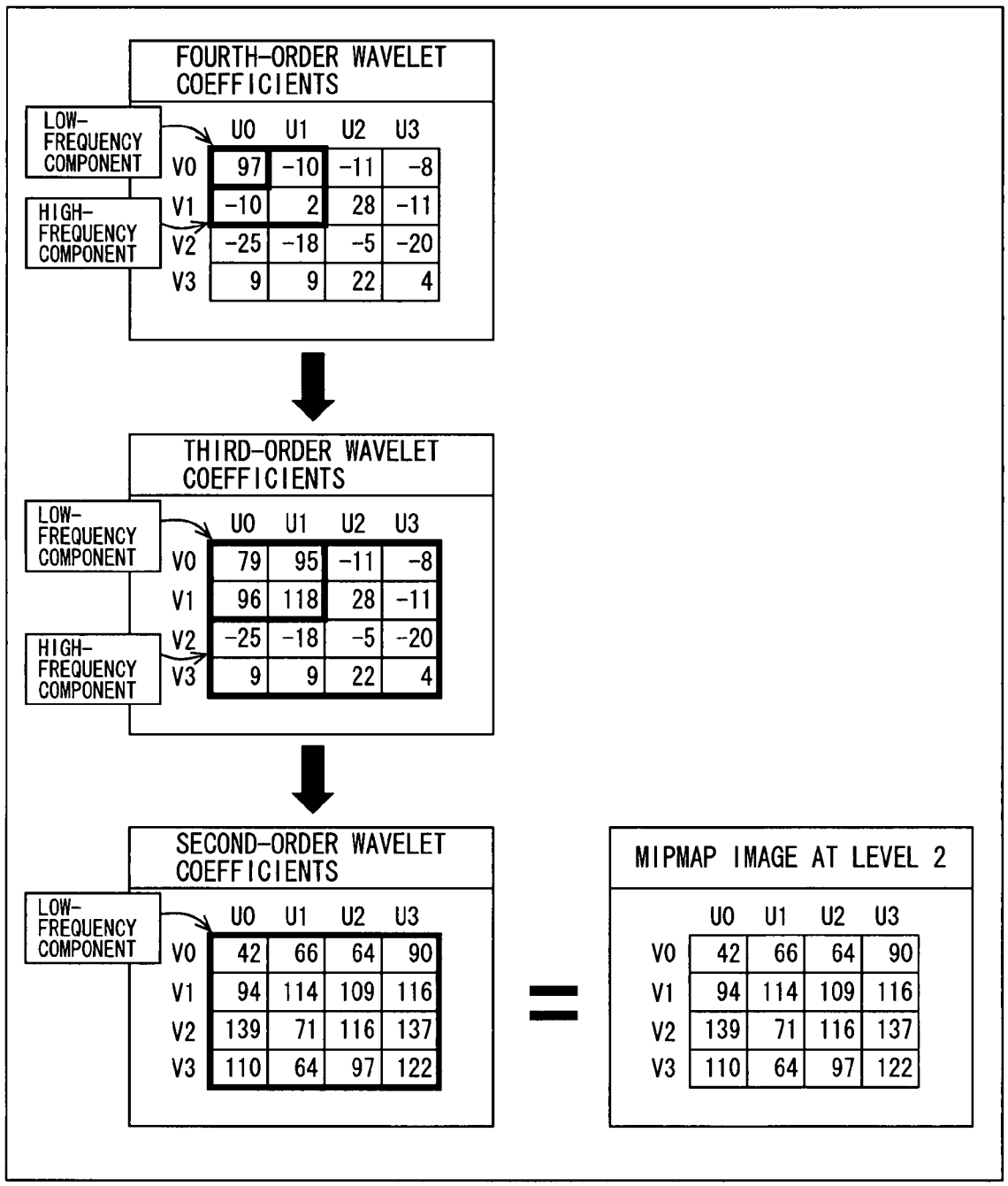

FIG. 13

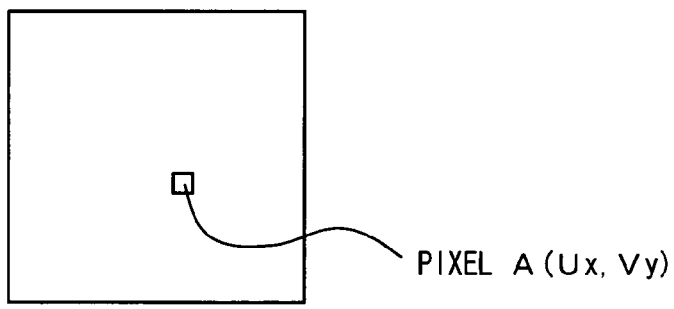

FIG. 14

(a) HIGH-FREQUENCY COMPONENT OF FIRST-ORDER WAVELET COEFFICIENTS

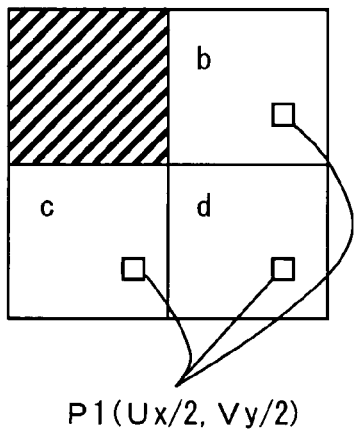

P1(Ux/2, Vy/2)

(b) HIGH-FREQUENCY COMPONENT OF SECOND-ORDER WAVELET COEFFICIENTS

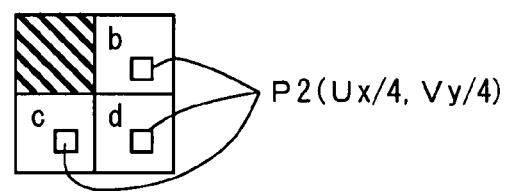

P2(Ux/4, Vy/4)

(c) HIGH-FREQUENCY COMPONENT OF THIRD-ORDER WAVELET COEFFICIENTS

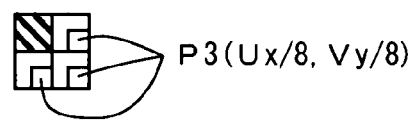

P3(Ux/8, Vy/8)

(d) HIGH-FREQUENCY COMPONENT OF FOURTH-ORDER WAVELET COEFFICIENTS

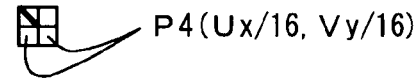

P4(Ux/16, Vy/16)

(e) LOW-FREQUENCY COMPONENT OF FOURTH-ORDER WAVELET COEFFICIENTS

P5(Ux/16, Vy/16)

F I G. 1 5
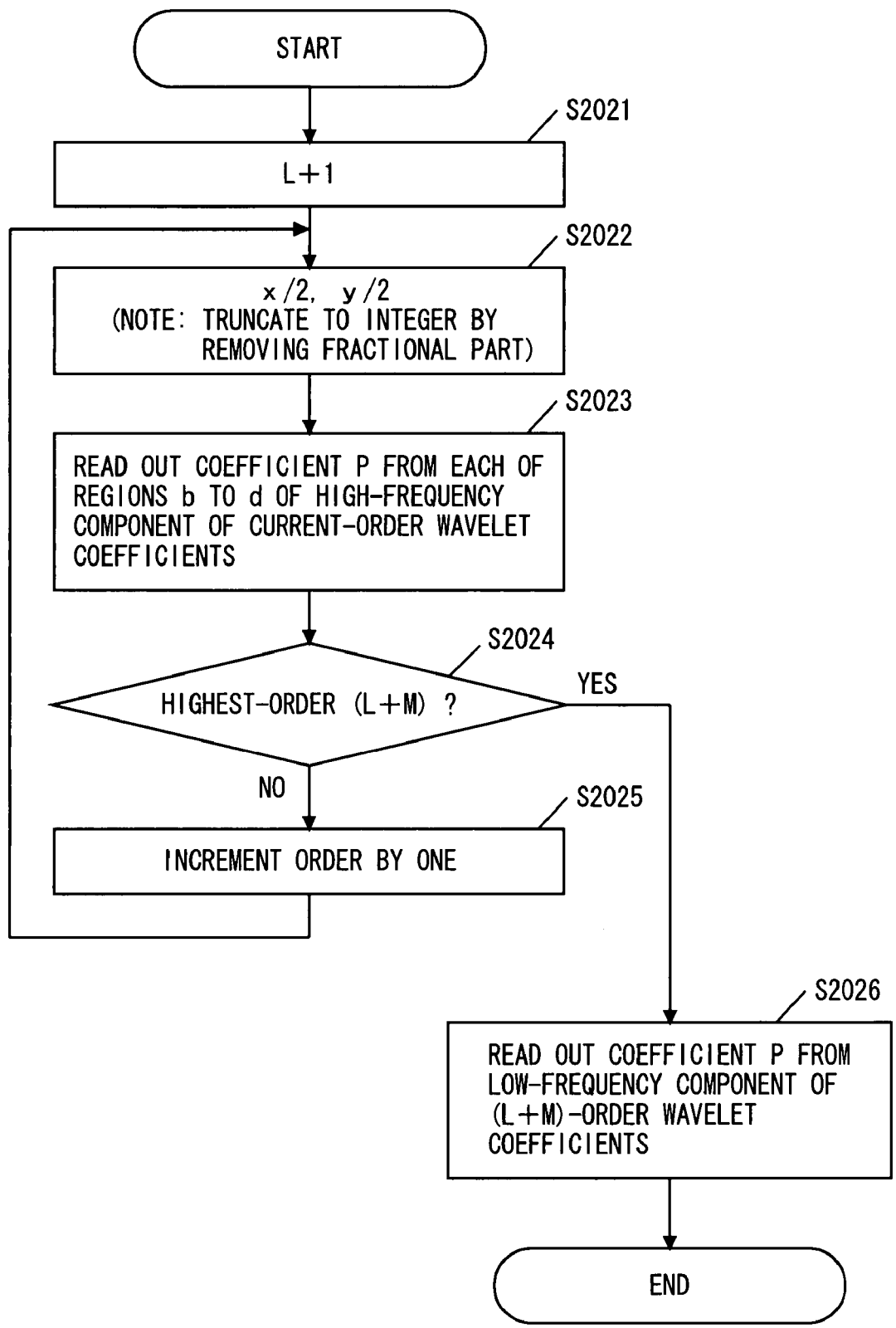

F I G. 1 6
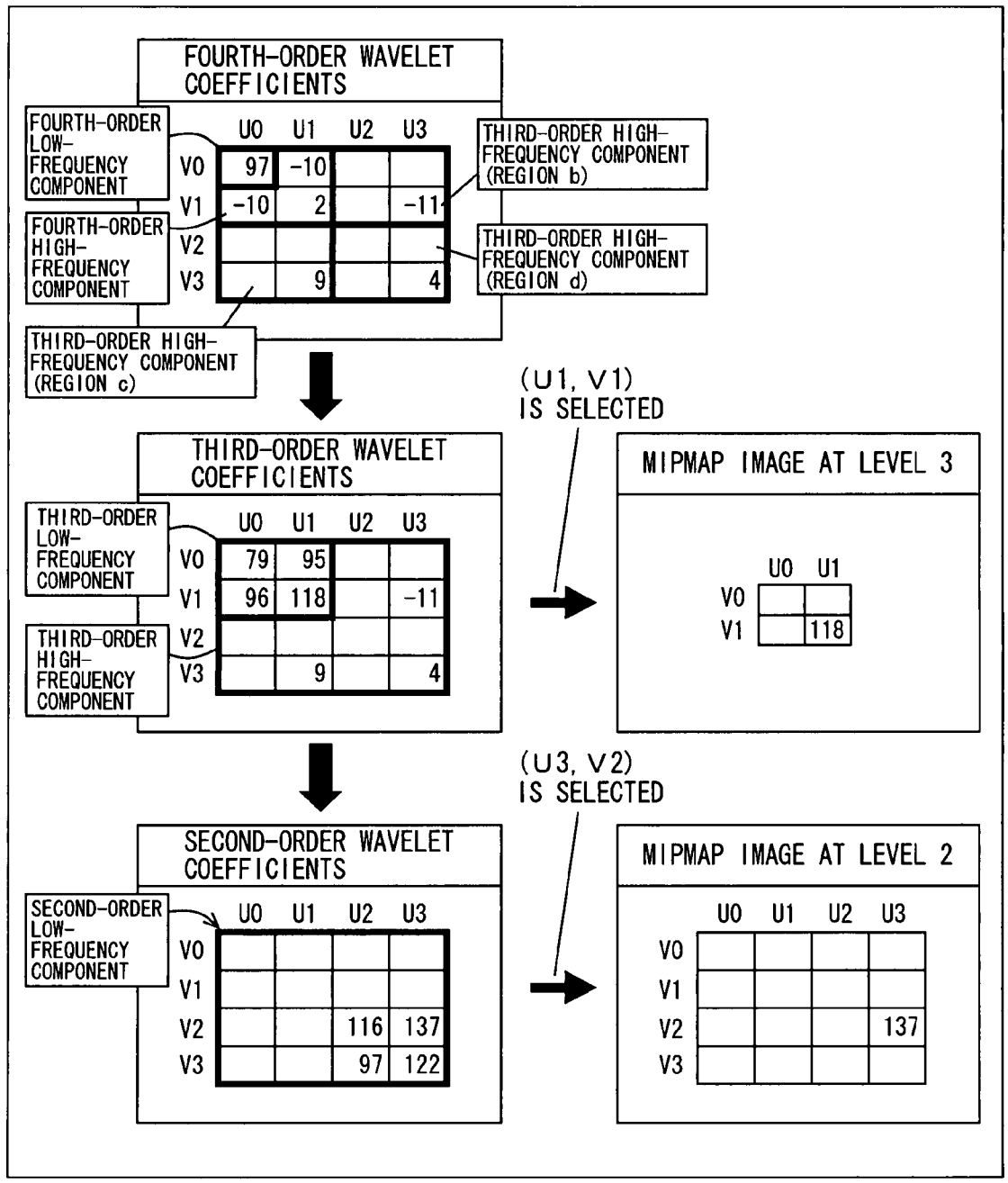

F I G. 1 7
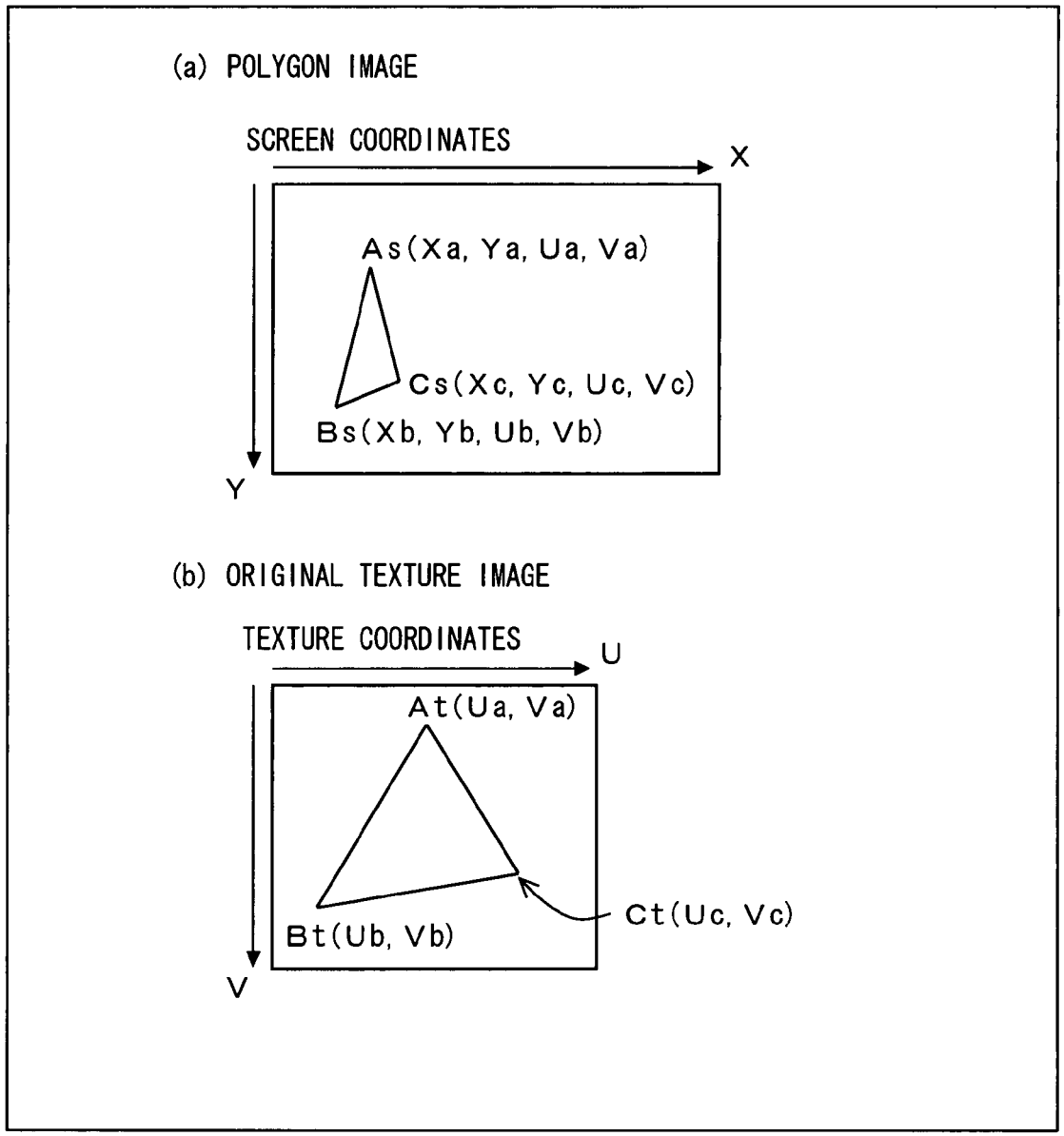

FIG. 18

(a) ORIGINAL TEXTURE IMAGE

|  | U0 | U1 | U2 | U3 | U4 | U5 | U6 | U7 | U8 | U9 | U10 | U11 | U12 | U13 | U14 | U15 |
|---|---|---|---|---|---|---|---|---|---|---|---|---|---|---|---|---|
| V0 | 32 | 32 | 31 | 31 | 31 | 33 | 30 | 27 | 49 | 50 | 51 | 53 | 62 | 80 | 95 | 105 |
| V1 | 40 | 40 | 39 | 40 | 47 | 57 | 65 | 69 | 57 | 46 | 33 | 29 | 39 | 63 | 90 | 111 |
| V2 | 57 | 51 | 42 | 39 | 48 | 67 | 82 | 92 | 88 | 81 | 66 | 58 | 68 | 92 | 110 | 117 |
| V3 | 52 | 49 | 42 | 47 | 65 | 94 | 116 | 127 | 116 | 104 | 79 | 59 | 69 | 100 | 120 | 123 |
| V4 | 80 | 83 | 76 | 74 | 86 | 102 | 112 | 123 | 126 | 109 | 82 | 68 | 80 | 106 | 118 | 116 |
| V5 | 91 | 94 | 89 | 90 | 103 | 116 | 123 | 131 | 125 | 118 | 108 | 104 | 111 | 122 | 123 | 117 |
| V6 | 98 | 102 | 98 | 100 | 109 | 116 | 115 | 119 | 116 | 112 | 110 | 110 | 114 | 118 | 121 | 123 |
| V7 | 104 | 109 | 108 | 110 | 117 | 118 | 114 | 116 | 114 | 114 | 115 | 117 | 116 | 115 | 122 | 132 |
| V8 | 140 | 140 | 128 | 116 | 105 | 91 | 76 | 75 | 94 | 103 | 117 | 123 | 118 | 111 | 113 | 123 |
| V9 | 189 | 178 | 152 | 124 | 100 | 74 | 52 | 48 | 57 | 80 | 105 | 112 | 105 | 103 | 113 | 128 |
| V10 | 163 | 147 | 117 | 93 | 78 | 61 | 48 | 47 | 60 | 99 | 137 | 144 | 132 | 131 | 146 | 163 |
| V11 | 172 | 150 | 116 | 94 | 84 | 73 | 61 | 61 | 84 | 141 | 196 | 206 | 186 | 172 | 172 | 179 |
| V12 | 145 | 121 | 98 | 84 | 66 | 45 | 42 | 52 | 58 | 97 | 135 | 146 | 127 | 105 | 89 | 84 |
| V13 | 89 | 78 | 72 | 77 | 75 | 60 | 46 | 41 | 53 | 58 | 64 | 76 | 97 | 119 | 126 | 123 |
| V14 | 138 | 125 | 106 | 88 | 70 | 55 | 49 | 49 | 75 | 90 | 102 | 108 | 118 | 135 | 138 | 132 |
| V15 | 135 | 141 | 139 | 122 | 98 | 86 | 91 | 101 | 95 | 121 | 138 | 131 | 124 | 134 | 145 | 149 |

(b) MIPMAP IMAGE AT MIPMAP LEVEL 1

|  | U0 | U1 | U2 | U3 | U4 | U5 | U6 | U7 |
|---|---|---|---|---|---|---|---|---|
| V0 | 36 | 35 | 42 | 48 | 51 | 42 | 61 | 100 |
| V1 | 52 | 43 | 69 | 104 | 97 | 66 | 82 | 118 |
| V2 | 87 | 82 | 102 | 122 | 120 | 91 | 105 | 119 |
| V3 | 103 | 104 | 115 | 116 | 114 | 113 | 116 | 125 |
| V4 | 162 | 130 | 93 | 63 | 84 | 114 | 109 | 119 |
| V5 | 158 | 105 | 74 | 54 | 96 | 171 | 155 | 165 |
| V6 | 108 | 83 | 62 | 45 | 67 | 105 | 112 | 106 |
| V7 | 135 | 114 | 77 | 73 | 95 | 120 | 128 | 141 |

(c) MIPMAP IMAGE AT MIPMAP LEVEL 2

|  | U0 | U1 | U2 | U3 |
|---|---|---|---|---|
| V0 | 42 | 66 | 64 | 90 |
| V1 | 94 | 114 | 109 | 116 |
| V2 | 139 | 71 | 116 | 137 |
| V3 | 110 | 64 | 97 | 122 |

(d) MIPMAP IMAGE AT MIPMAP LEVEL 3

|  | U0 | U1 |
|---|---|---|
| V0 | 79 | 95 |
| V1 | 96 | 118 |

(e) MIPMAP IMAGE AT MIPMAP LEVEL 4

|  | U0 |
|---|---|
| V0 | 97 |

DRAWING DEVICE, DRAWING METHOD, AND DRAWING PROGRAM

BACKGROUND OF THE INVENTION

1. Field of the Invention

The present invention relates to a drawing device, a drawing method, and a drawing program. More particularly, the present invention relates to a drawing device, a drawing method, and a drawing program for drawing, on a polygon image, a mipmap image, which is a texture image of a surface of a displayed object in three-dimensional computer graphics.

2. Description of the Background Art

Conventionally, there is a known technique called texture mapping as a three-dimensional computer graphics technique, in which a texture image is drawn on a polygon image of a three-dimensional object. The term "texture image" refers to an image which represents a pattern on a surface of a displayed object.

In three-dimensional computer graphics, a three-dimensional object is formed of a set of images (called "polygon images") of planar polygons (generally limited to triangles). A polygon image is defined by a three-dimensional coordinate system called a "world coordinate system". In order to display a three-dimensional object on a display unit (e.g., an LCD monitor, etc.), a geometric transform process is performed so that "world coordinates" which are defined for the three-dimensional object are transformed into coordinates in a two-dimensional coordinate system called a "screen coordinate system". The screen coordinate system is a two-dimensional coordinate system in which the coordinates of the upper left endpoint of a display screen is defined as (0, 0). For example, when the display unit is formed of a display device having 1920 pixels (width)×1080 pixels (length), the screen coordinate values can take numerical values ranging from (0, 0) to (1919, 1079). An exemplary original image of a texture and an exemplary polygon image which has been transformed into an image in the screen coordinate system are shown in FIG. 17. A portion (a) of FIG. 17 is a diagram showing the exemplary polygon image which has been transformed into an image in the screen coordinate system. A portion (b) of FIG. 17 is a diagram showing the exemplary original image of a texture. In the portion (a) of FIG. 17, As, Bs, and Cs are points indicating the vertices of the polygon image. The screen coordinates of the vertices are As(Xa, Ya), Bs(Xb, Yb), and Cs(Xc, Yc). Note that, as shown in the portion (a) of FIG. 17, texture coordinates (described below) as well as the screen coordinates are indicated for each vertex.

Texture mapping is performed using an original image of a texture and two numerical values (texture coordinates) indicating a place in the original image. In the portion (b) of FIG. 17, if the original texture image has, for example, a size of 1024 pixels both in length and in width, the texture coordinate values can take numerical values between (0, 0) and (1023, 1023). It is here assumed that a texture coordinate point corresponding to the vertex As of the polygon image is At(Ua, Va), a texture coordinate point corresponding to the vertex Bs is Bt(Ub, Vb), and a texture coordinate point corresponding to the vertex Cs is Ct (Uc, Vc). In this case, texture mapping is performed by mapping from At to As, from Bt to Bs, and from Ct to Cs. Note that, in this case, the shape of the polygon image formed of the vertices As to Cs is smaller than the shape of the original texture image formed of the vertices At to Ct. Therefore, the original texture image is reduced by the above-described texture mapping.

However, when the original texture image is reduced and processed, aliasing noise disadvantageously occurs as in image reducing processes and audio downsampling processes. To avoid such a problem, a technique of using a "mipmap image" has been proposed (see, for example, Mason Woo, et al., "The Official Guide to Learning Opengl, Version 1.1", US, Addison-Wesley, 1997, p. 339). A mipmap image is an image which is generated by reducing an original texture image successively into mipmap levels as shown in FIG. 18. FIG. 18 is a diagram showing an exemplary mipmap image. A portion (a) of FIG. 18 is a diagram showing an exemplary original texture image. A portion (b) of FIG. 18 is a diagram showing a mipmap image at a mipmap level 1. A portion (c) of FIG. 18 is a diagram showing a mipmap image at a mipmap level 2. A portion (d) of FIG. 18 is a diagram showing a mipmap image at a mipmap level 3. A portion (e) of FIG. 18 is a diagram showing a mipmap image at a mipmap level 4. In the portions (a) to (e) of FIG. 18, numerical values in rectangles indicate luminance values. The mipmap image at the mipmap level 1 is an image obtained by reducing the original texture image by a factor of 2 in both the lengthwise and widthwise directions. The mipmap images at the mipmap levels 2 to 4 are images obtained by reducing the respective immediately previous images by a factor of 2 in both the lengthwise and widthwise directions.

Hereinafter, a method for generating a mipmap image will be specifically described. When a mipmap image at the mipmap level 1 is generated, the average of luminances of four neighboring pixels in an original texture image is calculated. In the original image of the portion (a) of FIG. 18, the average of a luminance of 32 at (U0, V0), a luminance of 40 at (U0, V1), a luminance of 32 at (U1, V0), and a luminance of 40 at (U1, V1) is 36. The luminance of 36 is set into the value of a luminance at (U0, V0) of a mipmap image at the mipmap level 1 in the portion (b) of FIG. 18. Similarly, the average of luminances at (U2, V0), (U2, V1), (U3, V0), and (U3, V1) in the original image is set into the value of a luminance at (U1, V0) of the mipmap image at the mipmap level 1. In this manner, a mipmap image at each mipmap level is generated by calculating the average of luminances at four neighboring pixels of a mipmap image at the immediately previous mipmap level. To average the luminances of four neighboring pixels to generate a mipmap image also serves as a low-pass filter, thereby making it possible to prevent the occurrence of aliasing noise described above.

Hereinafter, a conventional drawing device 5 in which the above-described technique of using a mipmap image is implemented will be described with reference to FIG. 19. FIG. 19 is a diagram showing units constituting the conventional drawing device 5. The units constituting the drawing device 5 are interconnected via an internal bus. The units each perform a process by writing or reading data to or from a main memory 6 via a memory I/F (memory interface) 57.

From a storage medium (e.g., a CD-ROM, etc.) in which an original texture image which is a still image is stored, a mipmap generating unit 51 reads out the original image using a CD-ROM drive (not shown) or the like. The mipmap generating unit 51 generates mipmap images at the mipmap levels 1 and more from the read original image using the generation method described above. The generated mipmap images at the mipmap levels are written into the main memory 6. A polygon geometric transformation unit 53 transforms world coordinates defined in a polygon image into screen coordinates. The polygon geometric transformation unit 53 also compares the screen coordinates of points in the polygon image and the texture coordinates of corresponding points in the original image so as to calculate a reduction ratio of the original image. The polygon geometric transformation unit 53 obtains a required mipmap level from the calculated reduction ratio. A texture referencing unit 52 reads out a mipmap image at the obtained mipmap level from the main memory 6 and outputs the mipmap image to a polygon drawing unit 54. The polygon drawing unit 54 draws the mipmap image output from the texture referencing unit 52 on the polygon image. The polygon image on which the mipmap image is drawn is written into the main memory 6. A liquid crystal panel 7 is controlled by a video controller 55 to display the polygon image on which the mipmap image is drawn. A CPU 56 controls the whole processes of the units.

Thus, the conventional drawing device 5 generates and stores a number of kinds of mipmap images into the main memory 6 connected to the drawing device 5, and reads out a required mipmap image from the main memory 6 and draws the mipmap image on a polygon image.

However, in the conventional drawing device 5, when texture mapping is performed, a number of kinds of mipmap images need to be stored in the main memory 6 connected to the drawing device 5. Also, the data amount of those mipmap images is large. Therefore, the main memory 6 disadvantageously needs to have a large storage capacity. Further, when a texture image which is a moving image is used, a number of kinds of mipmap images need to be generated and stored in the main memory 6 for each frame. Therefore, when a texture image which is a moving image is used, the band congestion of the main memory 6 disadvantageously occurs.

SUMMARY OF THE INVENTION

Therefore, an object of the present invention is to provide a drawing device in which the data amount of data to be stored in a main memory is reduced, so that a required mipmap image at a mipmap level can be generated and drawn on a polygon image without the band congestion of a main memory connected to the drawing device, particularly even when a texture which is a moving image is used.

A first aspect of the present invention is directed to a drawing device for receiving an original image of a texture and drawing a mipmap image generated by reducing the original image on a polygon image, comprising a wavelet transform unit for transforming the original image into wavelet coefficients using a Harr wavelet transform formula, a level obtaining unit for obtaining a mipmap level of the mipmap image, an inverse wavelet transform unit for receiving and subjecting at least a portion of the wavelet coefficients obtained by the transformation by the wavelet transform unit, to an inverse transform using an inverse Harr wavelet transform formula until an order having a value equal to the mipmap level is obtained, and outputting an image represented by at least a portion of a low-frequency component of wavelet coefficients having the order having the value equal to the mipmap level, and a polygon drawing unit for drawing the image output by the inverse wavelet transform unit, as a mipmap image, on the polygon image.

In a second aspect based on the first aspect, the drawing device further comprises a decompress unit for receiving the original image divided into image blocks and compressed in units of the image blocks, each block including 2 to the power of N(N is an integer of 1 or more) pixels both in length and in width, and decompressing the original image in units of the image blocks. The wavelet transform unit transforms the original image decompressed by the decompress unit into wavelet coefficients in units of the image block. Note that the decompression unit, for example, corresponds to a processing unit which performs a decompression process in a moving image decoder 11 and a still image decoder 19 in embodiments described below.

In a third aspect based on the second aspect, the order of the wavelet coefficients obtained by the transformation by the wavelet transform unit has a value equal to N.

In a fourth aspect based on the first aspect, the drawing device further comprises a moving image output unit for receiving a moving image formed of a plurality of the original images, and outputting the original images one by one to the wavelet transform unit. Note that the moving image output unit, for example, corresponds to a processing unit which performs an output process in the moving image decoder 11 in embodiments described below.

In a fifth aspect based on the first aspect, the inverse wavelet transform unit receives and subjects only wavelet coefficients corresponding to all the low-frequency component of the wavelet coefficients having the order having the value equal to the mipmap level, of the wavelet coefficients obtained by the transformation by the wavelet transform unit, to the inverse transform, and outputs an image represented by all the low-frequency component of the wavelet coefficients having the order having the value equal to the mipmap level.

In a sixth aspect based on the first aspect, the inverse wavelet transform unit receives and subjects only wavelet coefficients corresponding to a portion of the low-frequency component of the wavelet coefficients having the order having the value equal to the mipmap level, of the wavelet coefficients obtained by the transformation by the wavelet transform unit, to the inverse transform, and outputs an image represented by the portion of the low-frequency component of the wavelet coefficients having the order having the value equal to the mipmap level.

In a seventh aspect based on the sixth aspect, the inverse wavelet transform unit receives only a portion of wavelet coefficients having an order higher than the mipmap level of the wavelet coefficients obtained by the transformation by the wavelet transform unit.

In an eighth aspect based on the seventh aspect, the mipmap level obtained in the mipmap level obtaining unit is L (L is an integer of 0 or more). The wavelet transform unit performs the transformation until the wavelet coefficients having an (L+M (M is an integer of 1 or more))th order are obtained. A position of the image represented by the portion of the low-frequency component of the wavelet coefficients is specified by predetermined coordinate values in the image represented by all the low-frequency component. The inverse wavelet transform unit receives only wavelet coefficients corresponding to coordinate values consisting of integer values obtained by dividing the predetermined coordinate values by 2 to the power of m, from a high-frequency component of (L+m (m is an integer of 1 or more and M or less))th-order wavelet coefficients, of the wavelet coefficients obtained by the transformation by the wavelet transform unit, for each of the (L+1)th order to the (L+M)th order, and receives only a wavelet coefficient corresponding to coordinate values consisting of integer values obtained by dividing the predetermined coordinate values by 2 to the power of M from the low-frequency component of the (L+M)th-order wavelet coefficients.

In a ninth aspect based on the first aspect, the inverse wavelet transform unit, when the mipmap level is not an integer, subjects the received wavelet coefficients to an inverse transform until an order having a value equal to an integer value of the mipmap level is obtained, thereby outputting an image represented by at least a portion of the low-frequency component of the wavelet coefficient having the order having the value equal to the integer value and an image represented by at least a portion of the low-frequency component of the wavelet coefficients having an order higher by one than the integer value which are obtained during the inverse transform.

In a tenth aspect based on the first aspect, the wavelet transform unit compresses a high-frequency component of the wavelet coefficients obtained by the transformation.

An eleventh aspect is directed to a drawing method for receiving an original image of a texture and drawing a mipmap image generated by reducing the original image on a polygon image, comprising a wavelet transform step of transforming the original image into wavelet coefficients using a Harr wavelet transform formula, a level obtaining step of obtaining a mipmap level of the mipmap image, an inverse wavelet transform step of receiving and subjecting at least a portion of the wavelet coefficients obtained by the transformation by the wavelet transform step, to an inverse transform using an inverse Harr wavelet transform formula until an order having a value equal to the mipmap level is obtained, and outputting an image represented by at least a portion of a low-frequency component of wavelet coefficients having the order having the value equal to the mipmap level, and a polygon drawing step of drawing the image output by the inverse wavelet transform step, as a mipmap image, on the polygon image.

A twelfth aspect of the present invention is directed to a drawing program for causing a computer to implement a drawing device for receiving an original image of a texture and drawing a mipmap image generated by reducing the original image on a polygon image, the program causing the computer to execute a wavelet transform step of transforming the original image into wavelet coefficients using a Harr wavelet transform formula, a level obtaining step of obtaining a mipmap level of the mipmap image, an inverse wavelet transform step of receiving and subjecting at least a portion of the wavelet coefficients obtained by the transformation by the wavelet transform unit, to an inverse transform using an inverse Harr wavelet transform formula until an order having a value equal to the mipmap level is obtained, and outputting an image represented by at least a portion of a low-frequency component of wavelet coefficients having the order having the value equal to the mipmap level, and a polygon drawing step of drawing the image output by the inverse wavelet transform step, as a mipmap image, on the polygon image.

A thirteenth aspect of the present invention is directed to a display device for receiving an original image of a texture and displaying a polygon image on which a mipmap image generated by reducing the original image is drawn, comprising a wavelet transform unit for transforming the original image into wavelet coefficients using a Harr wavelet transform formula, a storage unit for storing the wavelet coefficients obtained by the transformation by the wavelet transform unit, a level obtaining unit for obtaining a mipmap level of the mipmap image, an inverse wavelet transform unit for receiving and subjecting at least a portion of the wavelet coefficients from the storage unit, to an inverse transform using an inverse Harr wavelet transform formula until an order having a value equal to the mipmap level is obtained, and outputting an image represented by at least a portion of a low-frequency component of wavelet coefficients having the order having the value equal to the mipmap level, a polygon drawing unit for drawing the image output by the inverse wavelet transform unit, as a mipmap image, on the polygon image, and a display unit for displaying the polygon image drawn by the polygon drawing unit.

A fourteenth aspect of the present invention is directed to a display method for receiving an original image of a texture and displaying a polygon image on which a mipmap image generated by reducing the original image is drawn, comprising a wavelet transform step of transforming the original image into wavelet coefficients using a Harr wavelet transform formula, a storage step of causing a storage device to store the wavelet coefficients obtained by the transformation by the wavelet transform step, a level obtaining step of obtaining a mipmap level of the mipmap image, an inverse wavelet transform step of receiving and subjecting at least a portion of the wavelet coefficients from the storage device, to an inverse transform using an inverse Harr wavelet transform formula until an order having a value equal to the mipmap level is obtained, and outputting an image represented by at least a portion of a low-frequency component of wavelet coefficients having the order having the value equal to the mipmap level, a polygon drawing step of drawing the image output by the inverse wavelet transform step, as a mipmap image, on the polygon image, and a display step of displaying the polygon image drawn by the polygon drawing step.

According to the first aspect, the Harr wavelet transform formula is used to transform an original image into wavelet coefficients and inversely transform the wavelet coefficients, thereby generating a required mipmap image at a mipmap level. Thereby, data to be stored can be limited only to wavelet coefficients, thereby making it possible to generate a required mipmap image at a mipmap level without storing a large amount of or a large number of kinds of mipmap images. Also, since data to be stored can be limited only to wavelet coefficients, a required storage capacity of a main memory connected to the drawing device can be reduced. In addition, even when a texture is a moving image, a large number of kinds of mipmap images generated for each frame do not need to be stored into the main memory, thereby making it possible to prevent the band congestion of the main memory.

According to the second aspect, for an original image which has been divided into image blocks and compressed by, for example, MPEG, JPEG or the like, a decompress process and a process of transforming into wavelet coefficients can be performed in equal units. Thereby, the processing efficiency can be improved, thereby making it possible to generate a mipmap image with higher speed.

According to the third aspect, it is possible to generate a predetermined number of kinds of mipmap images, depending on the number of pixels in one image block.

According to the fourth aspect, a process of drawing a texture which is a moving image can be achieved without the band congestion of the memory device connected to the drawing device.

According to the fifth aspect, the amount of data received by the inverse wavelet transform unit is further reduced, thereby making it possible to suppress the band congestion of the memory device connected to the drawing device. In addition, the amount of computation for generating a mipmap image can be reduced by an amount corresponding to a reduction in the amount of data received by the inverse wavelet transform unit.

According to the sixth to eighth aspects, the amount of data received by the inverse wavelet transform unit is further reduced, thereby making it possible to suppress the band congestion of the memory device connected to the drawing device. In addition, the amount of computation for generating a mipmap image can be reduced by an amount corresponding to a reduction in the amount of data received by the inverse wavelet transform unit.

According to the ninth aspect, a low-frequency component of a plurality of wavelet coefficients having different orders, i.e., a plurality of mipmap images having different mipmap levels, are automatically obtained during inverse transformation. Therefore, according to the ninth aspect, as compared to when a plurality of mipmap images at their respectie mipmap levels are generated from scratch, the mipmap images can be generated with higher speed.

According to the tenth aspect, the amount of data to be stored can be further reduced. As a result, the required storage capacity of a memory device connected to the drawing device can be further reduced.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram showing one image block 20 of original image which has been decompressed;

FIG. 5 is a diagram showing first-order wavelet coefficients;

FIG. 9 is a diagram schematically showing a process of generating a mipmap image at a mipmap level 2 from fourth-order wavelet coefficients;

FIG. 13 is a diagram schematically showing a specific pixel A of one image block 20 of mipmap image;

FIG. 14 is a diagram schematically showing wavelet coefficients required for generation of only the pixel A;

FIG. 15 is a flowchart showing a flow of a process of reading out wavelet coefficients required for generation of the pixel A;

FIG. 16 is a diagram showing exemplary numerical values relating to the process of FIGS. 14 and 15 FIG. 15;

FIG. 17 is a diagram showing an exemplary original texture image and an exemplary polygon image which has been transformed into screen coordinates;

FIG. 18 is a diagram showing an exemplary mipmap image; and

DESCRIPTION OF THE PREFERRED EMBODIMENTS

Hereinafter, embodiments of the present invention will be described with reference to the accompanying drawings.

Figure 1:
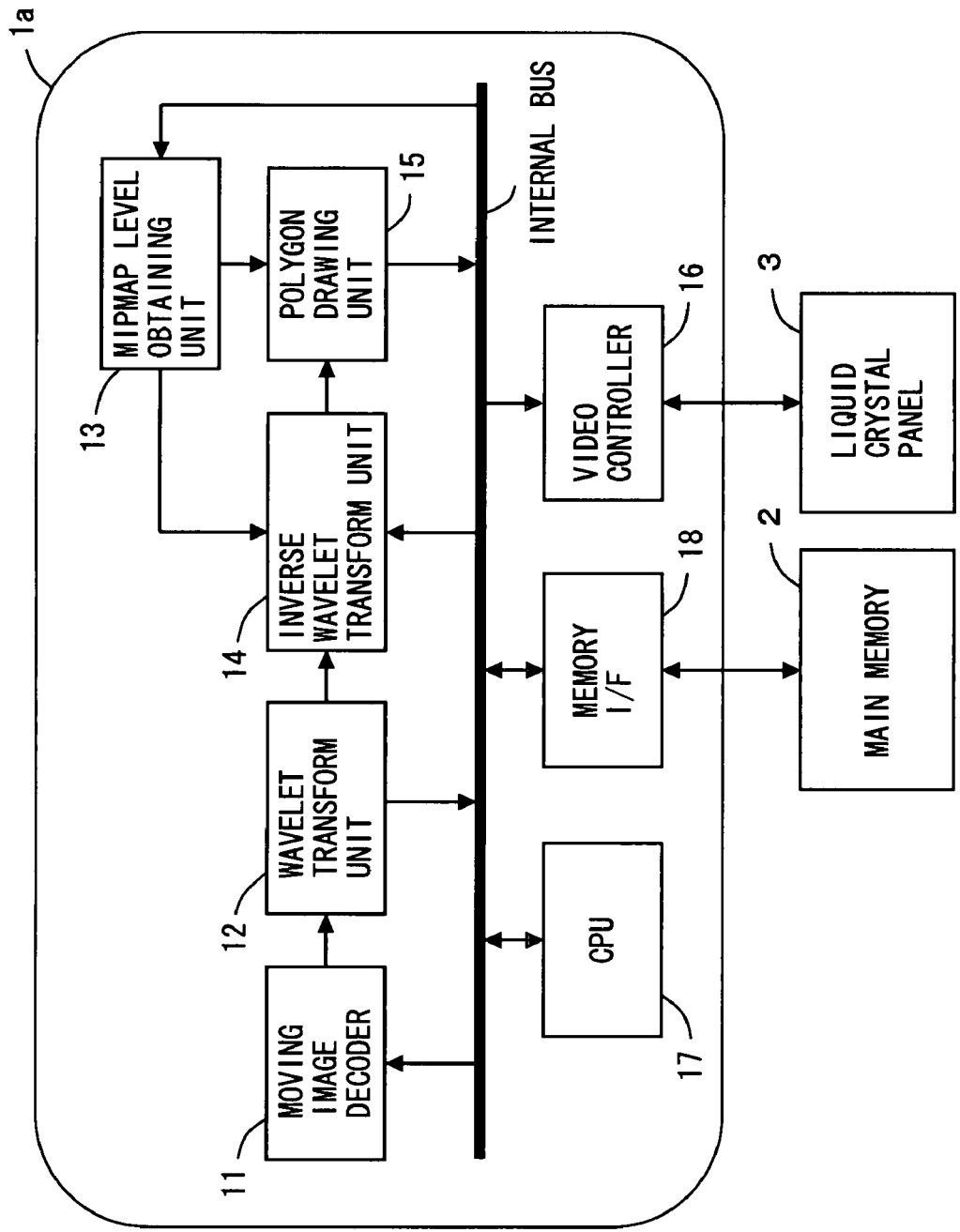
FIG. 1 is a diagram showing units constituting a drawing device 1a according to the present invention.

FIG. 1 is a diagram showing units constituting a drawing device 1a according to the present invention. In FIG. 1, the drawing device 1a comprises a moving image decoder 11, a wavelet transform unit 12, a mipmap level obtaining unit 13, an inverse wavelet transform unit 14, a polygon drawing unit 15, a video controller 16, a CPU 17, and a memory I/F (memory interface) 18. The drawing device 1a is connected to a main memory 2 and a liquid crystal panel 3. The drawing device 1a is formed of a one-chip system LSI. The main memory 2 is a storage device formed of a semiconductor memory, a hard disk drive or the like. Note that a display device according to the present invention comprises the drawing device 1a, the main memory 2, and the liquid crystal panel 3. Although the liquid crystal panel 3 is illustrated in FIG. 1, any device which can display a polygon image may be used, including, for example, a PDP. In the description below, a case where a moving image is used as texture will be described.

The units constituting the drawing device 1a are interconnected via an internal bus. The units each perform a process by writing or reading data to or from the main memory 2 via the memory I/F 18.

From a storage medium (e.g., a CD-ROM, etc.) in which moving image data of a texture which is compressed using MPEG or the like is stored, the moving image decoder 11 reads the moving image data using a CD-ROM drive (not shown) or the like. The moving image decoder 11 decompresses the moving image data thus read, and outputs the resultant data to the wavelet transform unit 12.

Figure 2:
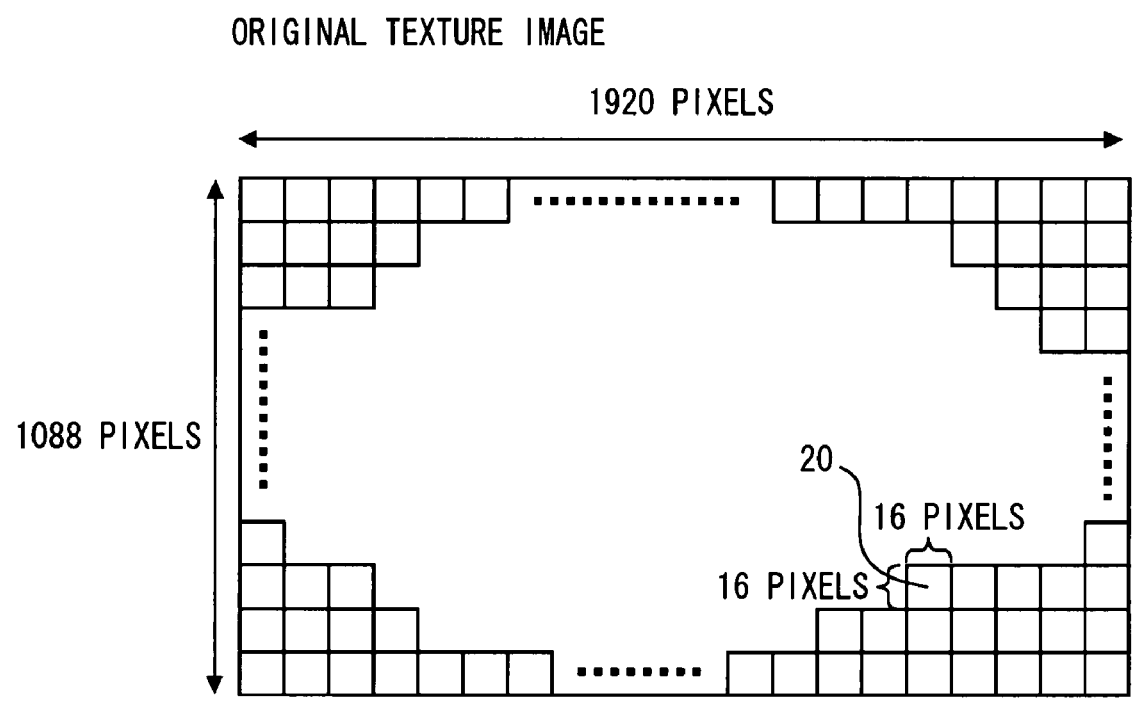
FIG. 2 is a diagram showing an original texture image corresponding to one frame.

The moving image data is data formed of a set of a plurality of frames each of which is an original texture image which is a still image. FIG. 2 shows an original texture image corresponding to one frame. The original texture image of FIG. 2 has, for example, 1088 pixels in length×1920 pixels in width.

The process of decompressing the compressed moving image data, such as representatively MPEG, is generally often performed in units of image blocks 20 (called macroblocks in MPEG) each of which includes pixels the number of which is 2 to the power of N(N is an integer of 1 or more) both in width and in length. More generally, the total number of pixels in each image block 20 is within the range of about 8 pixels to about 256 pixels. Therefore, it is here assumed that moving image data including an original image which is divided into image blocks 20 and is compressed is previously stored in a storage medium or the like. It is also assumed in FIG. 2 that, for example, each image block 20 has 16 pixels both in length and in width. The moving image decoder 11 reads out an original image from a storage medium in units of image blocks 20, and decompresses the read original image. By performing a process in units of image blocks 20 in this manner, the decompression process by the moving image decoder 11 and a transform process (described below) by the wavelet transform unit 12 are performed in equal units. As a result, the process efficiency is improved, thereby making it possible to generate a mipmap image with high speed.

The wavelet transform unit 12 transforms one image block 20 of an original image into wavelet coefficients using a Harr wavelet transform formula. The obtained wavelet coefficient is written into the main memory 2. Note that the obtained wavelet coefficients and the transform process by the wavelet transform unit 12 will be described in detail below.

The mipmap level obtaining unit 13 reads out data of a polygon image stored in a storage medium (e.g., a CD-ROM, etc.) using a CD-ROM drive (not shown) or the like. The mipmap level obtaining unit 13 transforms world coordinates defined for the polygon image into screen coordinates. The mipmap level obtaining unit 13 also compares the screen coordinates of points in the polygon image and the texture coordinates of corresponding points in the original image of FIG. 2 to calculate a reduction ratio of the one-frame original image of FIG. 2. As used herein, the reduction ratio refers to a ratio at which an original texture image is reduced in the lengthwise and widthwise directions. For example, when an image is reduced by a factor of 2 both in the lengthwise direction and in the widthwise direction, the reduction ratio is 1/2. Note that it is assumed that the reduction ratio is calculated using a known method, which will not be described in detail. The mipmap level obtaining unit 13 obtains a required mipmap level from the calculated reduction ratio.

Hereinafter, a method for obtaining a mipmap level will be specifically described. A mipmap image at the mipmap level 1 is an image obtained by reducing an original texture image by a factor of 2 both in the lengthwise direction and in the widthwise direction as described above. A mipmap image at the mipmap level 2 is an image obtained by reducing an original texture image by a factor of 4 both in the lengthwise direction and in the widthwise direction. Therefore, if the reduction ratio calculated by the mipmap level obtaining unit 13 is close to 1/4, the mipmap level obtaining unit 13 obtains the mipmap level 2.

Note that, in more general cases, if the calculated reduction ratio is 1/P (P is an integer of 1 or more), a mipmap level to be obtained by the mipmap level obtaining unit 13 is $\log_2 P$ (a logarithm whose base is 2). If the value of $\log_2 P$ is not an integer, the value may be rounded to an integer value, which may be considered as a mipmap level. Alternatively, if the value of $\log_2 P$ is not an integer, two mipmap levels between which the value of $\log_2 P$ is interposed are obtained, and mipmap images at these levels may be mixed. As a mixing ratio, for example, if the value of $\log_2 P$ is 2.3, a mipmap image at the mipmap level 2 and a mipmap image at the mipmap level 3 are mixed at a ratio of 7 to 3. Alternatively, the mipmap level obtaining unit 13 may obtain a mipmap level by adding or subtracting a specific value to or from $\log_2 P$.

Although it has been assumed above that the mipmap level obtaining unit 13 obtains a mipmap level from a calculated reduction ratio, the present invention is not limited to this. The user may directly specify a mipmap level, depending on the arrangement of a displayed scene, and the mipmap level obtaining unit 13 may obtain the mipmap level specified by the user.

The inverse wavelet transform unit 14 reads out from the main memory 2 the wavelet coefficients obtained by the transformation by the wavelet transform unit 12. The inverse wavelet transform unit 14 subjects the read wavelet coefficients to an inverse transform using an inverse Harr wavelet transform formula until an order having a value equal to the mipmap level is obtained. The inverse wavelet transform unit 14 outputs to the polygon drawing unit 15 an image represented by the low-frequency component of the wavelet coefficients obtained by the inverse transformation. The inverse wavelet transform process by the inverse wavelet transform unit 14 will be described in detail below.

The polygon drawing unit 15 draws an image output from the inverse wavelet transform unit 14, as a mipmap image, on a polygon image. Specifically, the polygon drawing unit 15 obtains luminances of all pixels in the polygon image as luminances of corresponding pixels in the mipmap image. The polygon image for all pixels of which luminances have been obtained is written into the main memory 2.

The liquid crystal panel 3 is controlled by the video controller 16 to display the polygon image on which the mipmap image has been drawn. The CPU 17 controls the whole process of each unit.

Figure 3:
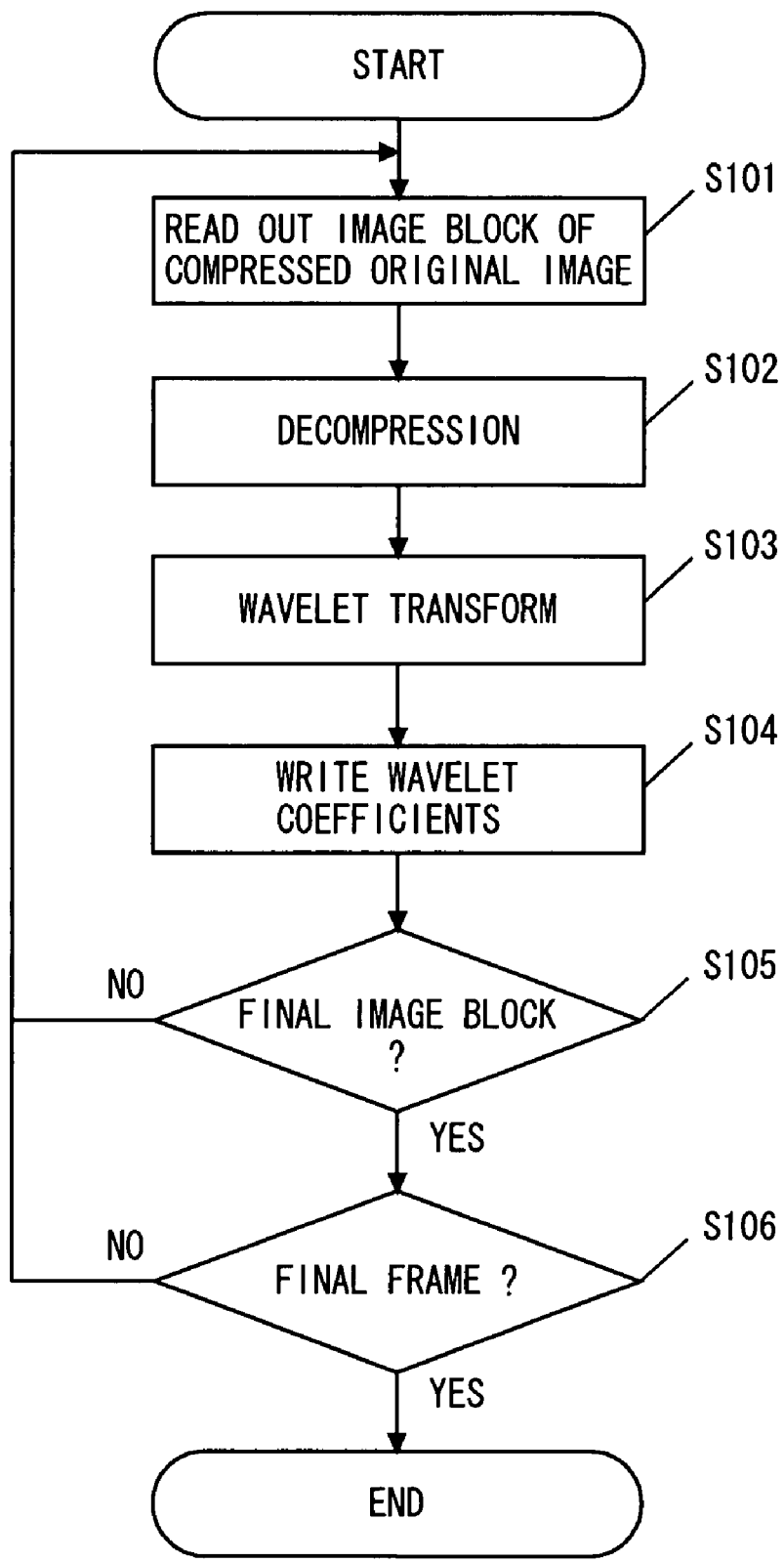
FIG. 3 is a flowchart showing a flow of a wavelet transform process.

Next, the wavelet transform process by the wavelet transform unit 12 will be described in detail with reference to FIG. 3. FIG. 3 is a flowchart showing a flow of the wavelet transform process.

In step S101, the moving image decoder 11 reads one image block 20 of a compressed original image from a storage medium. Following step S101, the moving image decoder 11 decompresses the read original image (step S102). FIG. 4 shows one image block 20 of the original image which has been decompressed. Each rectangle represents a pixel, and a numerical value in each rectangle represents a luminance. Note that the moving image decoder 11, which supports moving image data, such as MPEG or the like, generally outputs three kinds of luminances (R, G, B or Y, U, V) for each pixel. However, for the sake of simplicity, only one kind of luminance is indicated in FIG. 4.

Following step S102, the wavelet transform unit 12 transforms one image block 20 of the original image into wavelet coefficients using a Harr wavelet transform formula (step S103). The Harr wavelet transform formula used herein is represented as follows.

$$a=(A+B+C+D)/4 \quad (1)$$

$$b=(A-B+C-D)/4 \quad (2)$$

$$c=(A+B-C-D)/4 \quad (3)$$

$$d=(A-B-C+D)/4 \quad (4)$$

In expressions (1) to (4), a represents a low-frequency component of the wavelet coefficients, and b, c, and d each represent a high-frequency component of the wavelet coefficients. Also, A, B, C, and D represent the luminances of four neighboring pixels.

Hereinafter, as an example, a case where four pixels at the upper left end of FIG. 4 are subjected to wavelet transformation will be described. Of the four pixels at the upper left end, the luminance of (U0, V0) is A, the luminance of (U1, V0) is B, the luminance of (U0, V1) is C, and the luminance of (U1, V1) is D. The luminances represented by A to D are A=32, B=32, C=40, and D=40. The luminances of A to D are substituted into expressions (1) to (4), thereby obtaining a=36, b=0, c=−4, and d=0.

The obtained values of a to d are arranged at positions as shown in FIG. 5. FIG. 5 is a diagram showing first-order wavelet coefficients. As shown in FIG. 5, a is placed at (U0, V0), b is placed at (U8, V0), c is placed at (U0, V8), and d is placed at (U8, V8). Such a process is performed every four pixels from the upper left end of FIG. 4 for all pixels of the image block 20, finally resulting in the wavelet coefficients of FIG. 5. The above-described process is a first-order wavelet transform process, and the wavelet coefficients of FIG. 5 are first-order wavelet coefficients. Note that the first-order wavelet coefficients are divided into a region a including a low-frequency component and regions b, c and d including a high-frequency component as shown in FIG. 5.

Figure 6:
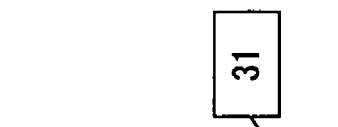
FIG. 6 is a diagram showing first- to fourth-order wavelet coefficients.

Next, the wavelet transform unit 12 performs a wavelet transform process similar to the first-order wavelet transform process using expressions (1) to (4) with respect to the low-frequency component a of the first-order wavelet coefficients. By the process, the calculated wavelet coefficients are of the second order. Thus, the second-order and later wavelet transform processes are performed with respect to a low-frequency component. FIG. 6 is a diagram showing first- to fourth-order wavelet coefficients. In FIG. 6, 31 indicates a high-frequency component of first-order wavelet coefficients, 32 indicates a high-frequency component of second-order wavelet coefficients, 33 indicates a high-frequency component of third-order wavelet coefficients, 34 indicates a high-frequency component of fourth-order wavelet coefficients, and 35 indicates a low-frequency component of the fourth-order wavelet coefficients. Note that there is only one low-frequency component 35 of the fourth-order wavelet coefficients. Therefore, for image blocks 20 each having 16 pixels both in length and in width, higher than the fourth-order wavelet transform processes cannot be performed.

Note that wavelet transform processes do not necessarily need to be performed until an order at which the transform process cannot be further performed. However, by performing transform processes until an order at which a transform process cannot be further performed, a larger number of kinds of mipmap images can be eventually generated, depending on the number of pixels in the image block 20. If each image block 20 has 2 to the power of N pixels both in width and length, the order at which a transform process cannot be further performed is N. Therefore, if transform processes are performed until the Nth-order wavelet coefficient is obtained in the wavelet transform unit 12, then even when transform processes are performed in units of image blocks 20 each having a different number of pixels, a larger number of kinds of mipmap images can be generated, depending on the number of pixels in the image block 20.

Following step S103, the wavelet transform unit 12 writes the wavelet coefficients of FIG. 6 into the main memory 2 (step S104). The wavelet transform unit 12 determines whether or not the original texture image of FIG. 2 has been processed until the final image block 20 (step S105). When it is determined that the final image block 20 has not yet been processed, the process of step S101 is performed with respect to the next image block 20. When it is determined that the final image block 20 has been processed, the flow goes to step S106. In step S106, the wavelet transform unit 12 determines whether or not the process has been performed until the final frame. When it is determined that the process has not yet been performed until the final frame, the process of step S101 is performed with respect to the next frame. When it is determined that the process has been performed until the final frame, the process of the wavelet transform unit 12 is ended.

Note that, in the process of FIG. 3, only one kind of luminance is considered above. When there are three kinds of luminances (e.g., R, G, B or Y, U, V), the above-described processes of steps S101 to S104 are repeated three times. In other words, the processes of steps S101 to S104 may be repeated the number of times corresponding to the number of kinds of luminances.

The procedure of FIG. 3 is provided only for illustrative purposes. An actual system LSI can be implemented in which the processes of steps S102 and S103 are simultaneously performed. Specifically, while the wavelet transform unit 12 is performing a wavelet transform, the moving image decoder 11 can decompress the immediately next image block 20. An FIFO memory (not shown) can be further provided between the moving image decoder 11 and the wavelet transform unit 12, and several or several tens of image blocks 20 may be bufferred. In this case, the moving image decoder 11 decompresses several or several tens of next image blocks 20 in advance.

Figure 7:
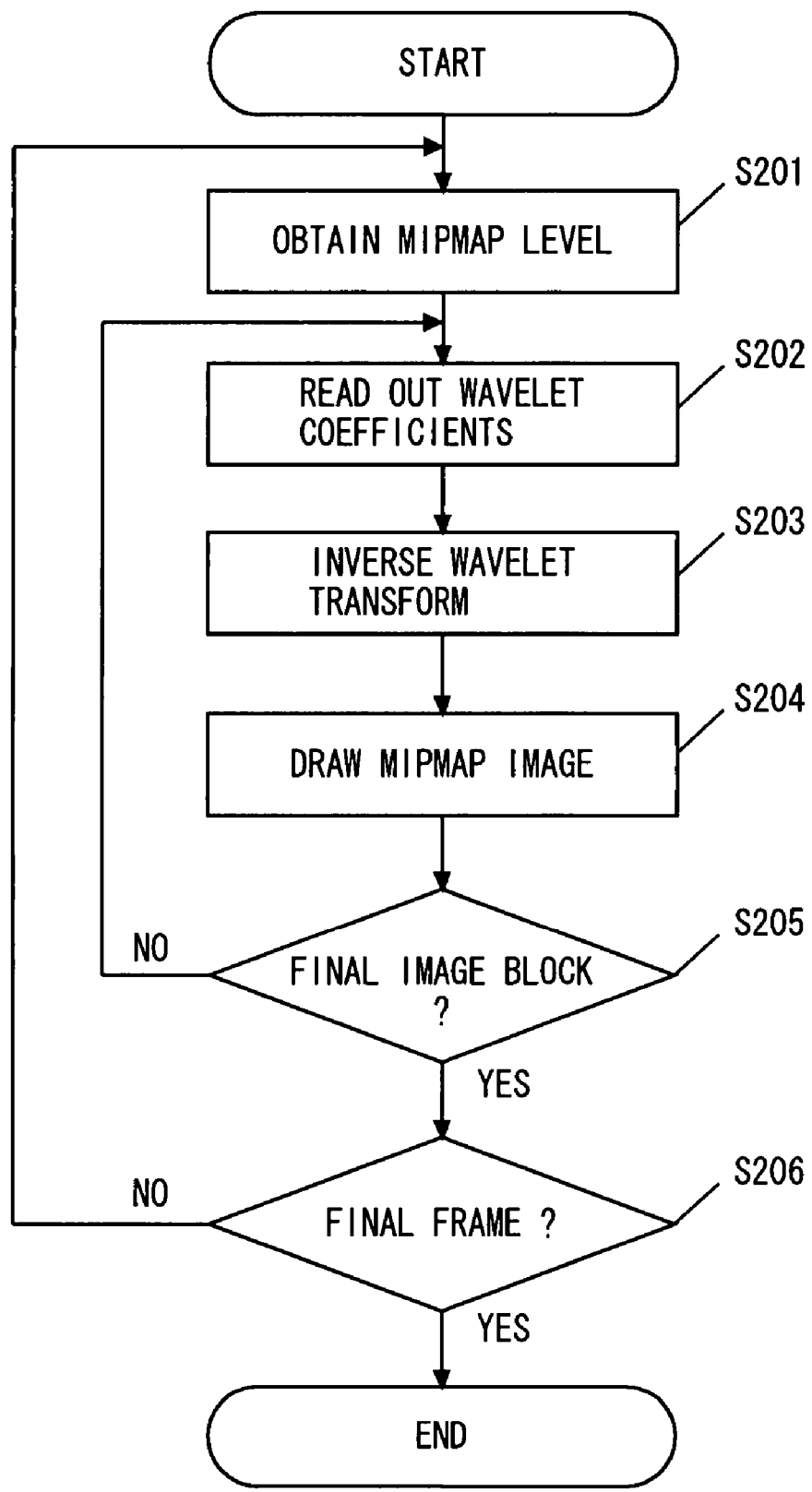
FIG. 7 is a flowchart showing a flow indicating an inverse wavelet transform process and a polygon image drawing process.

Next, the inverse wavelet transform process and the polygon image drawing process will be described in detail with reference to FIG. 7. FIG. 7 is a flowchart showing a flow indicating the inverse wavelet transform process and the polygon image drawing process.

In step S201, the mipmap level obtaining unit 13 compares the screen coordinates of points in a polygon image and the texture coordinates of corresponding points in the original image of FIG. 2 to calculate a reduction ratio of one frame of the original image of FIG. 2. Thereafter, the mipmap level obtaining unit 13 obtains a required mipmap level from the calculated reduction ratio.

Following step S201, the inverse wavelet transform unit 14 reads out only coefficient(s) corresponding to all low-frequency component of wavelet coefficients having an order having a value equal to the mipmap level of the wavelet coefficients of the image block 20 stored in the main memory 2 (step S202). The inverse wavelet transform unit 14 subjects the wavelet coefficients thus read to an inverse transform using the inverse Harr wavelet transform formula until the order having the value equal to the mipmap level (step S203).

Hereinafter, the processes of steps S202 and S203 will be described in detail. As described above, a mipmap image is generally generated by averaging four neighboring pixels. In contrast to this, the low-frequency component of wavelet coefficients is also obtained by averaging four neighboring pixels as indicated by expression (1). In other words, expression (1) for obtaining the low-frequency component of wavelet coefficients is the same as an expression for generating a mipmap image. Therefore, the luminance of an image represented by the low-frequency component a of the first-order wavelet coefficients of FIG. 5 is equal to the luminance of a mipmap image at the mipmap level 1 indicated in the portion (b) of FIG. 18. As a result, an image represented by the low-frequency component of wavelet coefficients is a mipmap image which is generated by a low-pass filter as in the conventional art.

Figure 8:
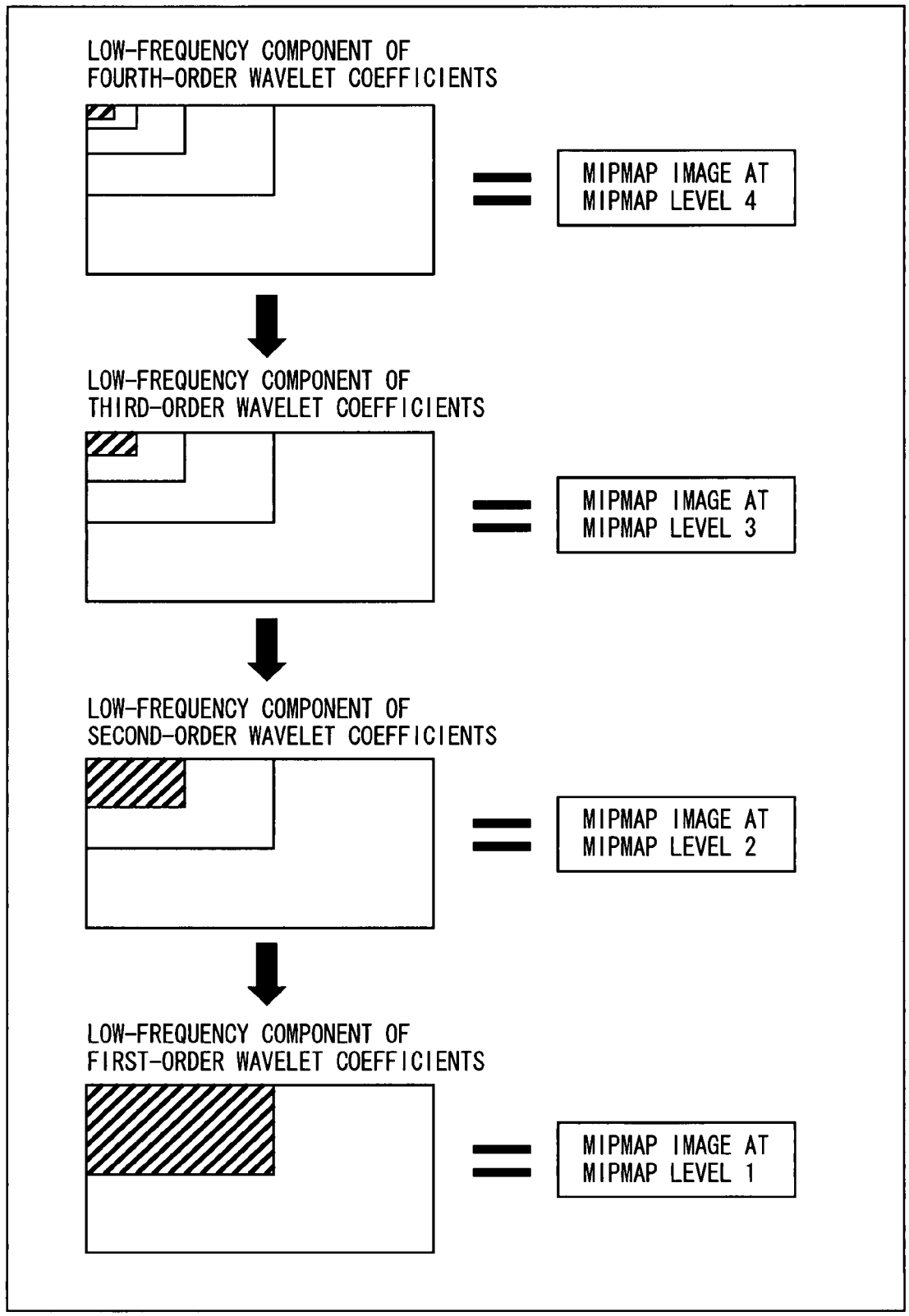
FIG. 8 is a diagram showing a correspondence between orders of a low-frequency component of wavelet coefficients and mipmap levels.

FIG. 8 is a diagram showing a correspondence between the orders of the low-frequency component of wavelet coefficients and the mipmap levels. As shown in FIG. 8, an image represented by the low-frequency component of fourth-order wavelet coefficients is the same as a mipmap image at the mipmap level 4. An image represented by the low-frequency component of third-order wavelet coefficients is the same as a mipmap image at the mipmap level 3. An image represented by the low-frequency component of second-order wavelet coefficients is the same as a mipmap image at the mipmap level 2. An image represented by the low-frequency component of first-order wavelet coefficients is the same as a mipmap image at the mipmap level 1. By utilizing this correspondence, a mipmap image at any mipmap level can be easily obtained from fourth-order wavelet coefficients.

It is here assumed that the mipmap level obtained in step S201 is 2. In this case, the inverse wavelet transform unit 14 performs an inverse transform process until an image represented by the low-frequency component of second-order wavelet coefficients is generated. Here, as shown in FIG. 9, a mipmap image at the mipmap level 2 has a total of 16 pixels (four pixels in length×four pixels in width). FIG. 9 is a diagram schematically showing a process of generating a mipmap image at the mipmap level 2 from fourth-order wavelet coefficients. Therefore, in order to generate an image represented by the low-frequency component of second-order wavelet coefficients, the inverse wavelet transform unit 14 may read out only 16 coefficients at the upper left end including fourth-order wavelet coefficients of the wavelet coefficients stored in the main memory 2 in step S202. Specifically, in step S202, the inverse wavelet transform unit 14 may read out from the main memory 2 only coefficient(s) corresponding to all low-frequency component of wavelet coefficients having an order having a value equal to the mipmap level obtained in step S201. In other words, the inverse wavelet transform unit 14 may read out from the main memory 2 only wavelet coefficient(s) within a region corresponding to a mipmap image at a mipmap level obtained in step S201. Thereby, it is possible to reduce the amount of data which the inverse wavelet transform unit 14 receives from the main memory 2. As a result, the band congestion of the main memory 2 can be further suppressed.

Here, the inverse Harr wavelet transform formula used herein is represented by expressions (5) to (8) below. Expressions (5) to (8) are inverse to expressions (1) to (4).

$$A=a+b+c+d \quad (5)$$

$$B=a-b+c-d \quad (6)$$

$$C=a+b-c-d \quad (7)$$

$$D=a-b-c+d \quad (8)$$

The fourth-order wavelet coefficients of FIG. 9 are a=(U0, V0)=97, b=(U1,V0)=−10, c=(U0,V1)=−10, and d=(U1,V1)=2. By substituting these luminances a to d into expressions (5) to (8), the luminances A to D are obtained. The obtained luminances of A to D are the low-frequency component of third-order wavelet coefficients as shown in FIG. 9. Similarly, by using expressions (5) to (8), the low-frequency component of second-order wavelet coefficients is obtained from the third-order wavelet coefficients of FIG. 9. As shown in FIG. 9, an image represented by the low-frequency component of the second-order wavelet coefficients corresponds to a mipmap image at the mipmap level 2.

Following step S203, the polygon drawing unit 15 draws an image output from the inverse wavelet transform unit 14 as a mipmap image on a polygon image (step S204). Following step S204, the polygon drawing unit 15 determines whether or not the drawing process has been processed until the final image block 20 in the original texture image of FIG. 2 (step S205). When it is determined that the final image block 20 has not been processed, the process of step S202 is performed with respect to the next image block 20. When it is determined that the final image block 20 has been processed, the flow goes to step S206. In step S206, the polygon drawing unit 15 determines whether or not the process has been performed until the final frame. When it is determined that the process has not yet been performed until the final frame, the process of step S201 is performed with respect to the next frame. When it is determined that the process has been performed until the final frame, the process is ended.

As described above, according to the drawing device 1a of the present invention, the Harr wavelet transform formula is used to transform an original image into wavelet coefficients and inversely transform the wavelet coefficients, thereby generating a required mipmap image at a mipmap level. Thereby, data to be stored into the main memory 2 can be limited only to wavelet coefficients, thereby making it possible to generate a required mipmap image at a mipmap level without storing a large amount of or a large number of kinds of mipmap images. Also, since data to be stored into the main memory 2 can be limited only to wavelet coefficients, a required storage capacity of the main memory 2 connected to the drawing device 1a can be reduced.

Also, according to the drawing device 1a of the present invention, even when a texture is a moving image, a large number of kinds of mipmap images generated for each frame do not need to be stored into the main memory 2, thereby making it possible to prevent the band congestion of the main memory 2.

Also, conventionally, a technique of using a discrete cosine transform (DCT) and holding only DCT coefficients in a main memory instead of preparing a large number of mipmap images has been proposed. However, in this conventional technique, an inverse DCT process for holding DCT coefficients every time a texture is referenced is required. Thereby, the circuit scale disadvantageously increases. Further, since a low-pass filter is used which is different from the conventional technique of using a mipmap image, the image quality of the drawing result is reduced as compared to the conventional technique of using a mipmap image. Further, the inverse DCT process has a large processing load. As a result, it is difficult to improve the process performance of the drawing device.

In contrast to this, according to the drawing device 1a of the present invention, a wavelet transform and an inverse wavelet transform are used which have a processing load smaller than that of the DCT and inverse DCT processes. Thereby, the circuit scale can be reduced. Also, since the processing load is small, the process performance of the drawing device can be improved as compared to the conventional art. Also, when the Harr wavelet transform formula is used for transformation, a low-pass filter which is the same as the conventional technique of using a mipmap image can be provided. Thereby, the same image quality which is provided by the conventional technique of using a mipmap image can be secured.

Note that it has been assumed above that the wavelet transform unit 12 stores wavelet coefficients obtained by transformation into the main memory 2. The high-frequency component of wavelet coefficients is characteristically difficult to be recognized by human eyes. Therefore, the high-frequency component of wavelet coefficients may be subjected to quantization, entropy encoding, arithmetic encoding or the like (lossless or lossy compression), which reduce the mount of information, before being stored into the main memory 2. Thereby, the capacity of the main memory 2 can be further reduced.

When a texture is a general nature image, the high-frequency component of wavelet coefficients characteristically tends to have small absolute values. Therefore, in the case of nature images, lossless compression by entropy encoding is particularly more effective. The high-frequency component of wavelet coefficients may be compressed either by lossless or lossy compression, more preferably by lossless compression. This is because lossless compression can produce perfectly the same mipmap image which is obtained by the conventional technique of using a mipmap image. Note that, if the wavelet transform unit 12 subjects the high-frequency component of wavelet coefficients to lossy or lossless compression, the inverse wavelet transform unit 14 may decompress the compressed high-frequency component when reading out them from the main memory 2.

Figure 10:
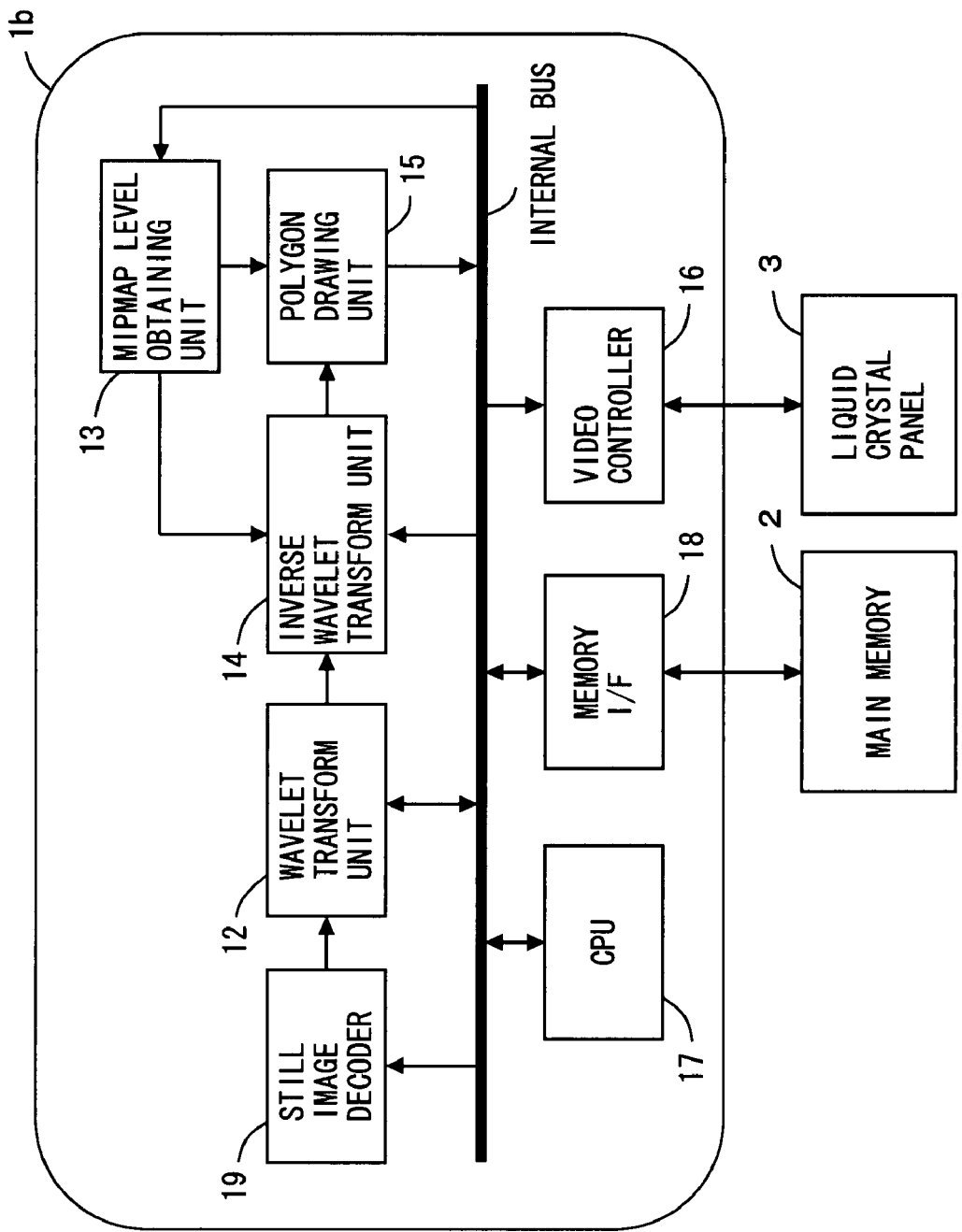
FIG. 10 is a diagram showing units constituting a drawing device 1b which uses a texture which is a still image.

Although the case where a texture which is a moving image is drawn on a polygon image has been described above, the present invention is not limited to this. Even when a texture which is a still image is simply drawn on a polygon image, an effect similar to when a texture which is a moving image is used can be obtained. FIG. 10 shows units constituting a drawing device 1b which uses a texture which is a still image. In FIG. 10, the drawing device 1b is different from the drawing device 1a described above in that the moving image decoder 11 is replaced with a still image decoder 19. The still image decoder 19 performs a decompression process with respect to an original texture image which is a compressed still image in units of image blocks 20, and outputs the result to the wavelet transform unit 12. Thereby, as in the drawing device 1a comprising the moving image decoder 11, the decompression process and the wavelet transform process are performed in equal units. As a result, the process efficiency is improved, thereby making it possible to generate a mipmap image with high speed. Note that the process by the drawing device 1b is similar to the above-described process which is performed with respect to one frame of original texture image by the drawing device 1a, and will not be described. Note that, when an original texture image to be processed is non-compressed data, neither the moving image decoder 11 of the drawing device 1a nor the still image decoder 19 of the drawing device 1b is required.

It has been assumed that the compression format of moving image data is MPEG. Specifically, MPEG includes MEPG-1, MEPG-2, and MEPG-4. The compression format of moving image data or still image data is not limited to MPEG, and may be JPEG or the DV format, which are applicable to the drawing devices 1a and 1b of the present invention. The other compression formats (including those which will be created in the future) are applicable to the drawing devices 1a and 1b of the present invention, if decompression is performed in units of image blocks 20 each including 2 to the power of N pixels both in width and in length.

Although it has been assumed in FIG. 1 that only the drawing device 1a is formed of a one-chip system LSI, the present invention is not limited to this. A recent advance in the packaging density of a system LSI may allows the drawing device 1a and the main memory 2 to be mounted on a one-chip system LSI. Alternatively, the drawing device 1a may be formed of a combination of a plurality of LSIs instead of one chip. The system LSI configuration described above also applies to the drawing device 1b of FIG. 10.

Note that only units relating to the present invention are excerpted and shown FIGS. 1 and 10. Therefore, in some actual system LSIs, a unit having a function of processing audio may be included in addition to the units described above.

Note that the moving image decoder 11 of FIG. 1 reads out and obtains moving image data from a storage medium. Similarly, the still image decoder 19 of FIG. 10 also reads out and obtains an original texture image which is a still image from a storage medium. However, the moving image decoder 11 or the still image decoder 19 may obtain data from a communication channel which uses radio waves, the Internet or the like, instead of recording media. Also in this case, an effect similar to when data is obtained from a storage medium can be achieved.

Hereinafter, Variations 1 and 2 which relate to the inverse wavelet transform process and the polygon image drawing process of FIG. 7 will be described.

(Variation 1)

Figure 11:
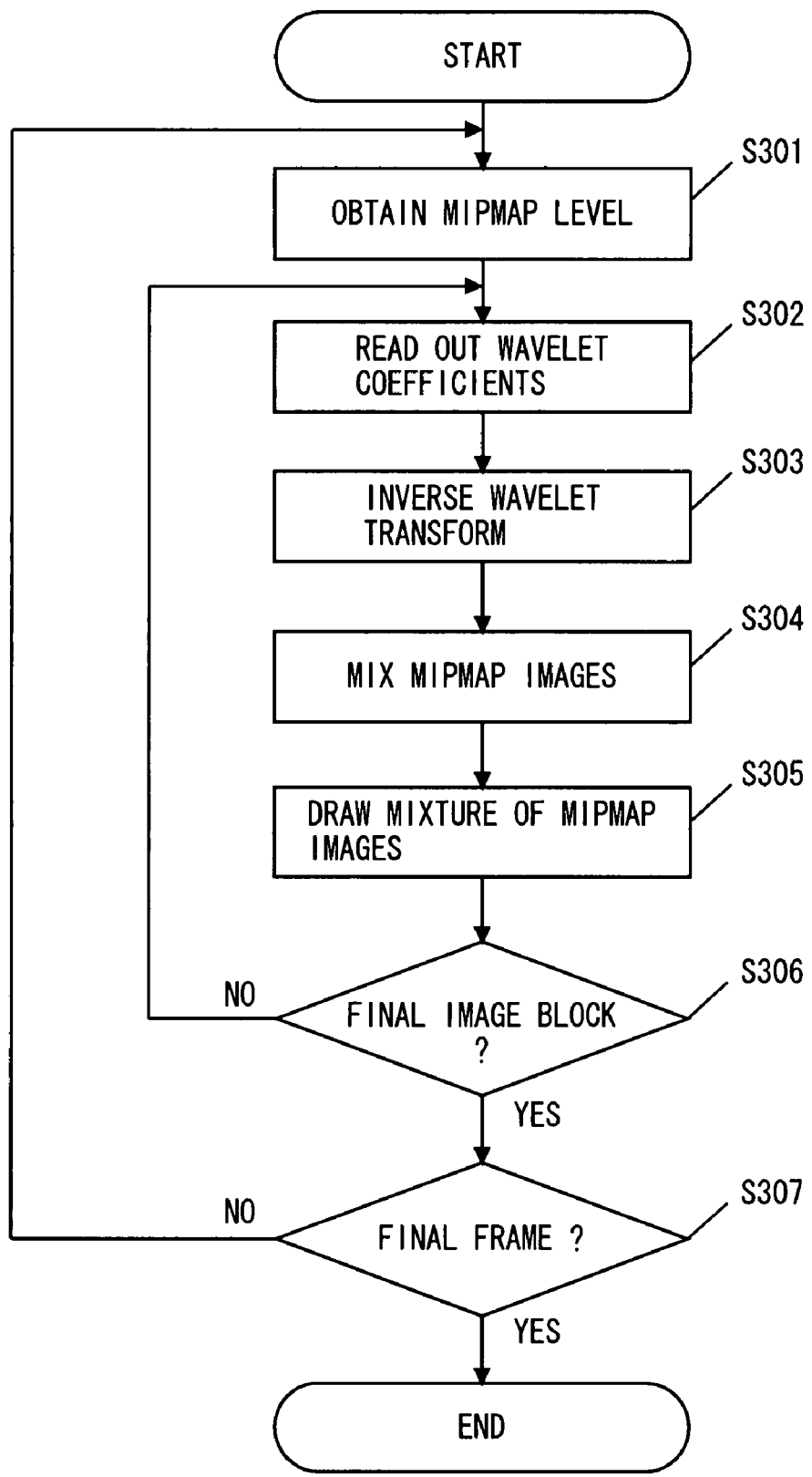
FIG. 11 is a flowchart showing a flow including an inverse wavelet transform process and a polygon image drawing process of Variation 1.

As described above, when the mipmap level obtaining unit 13 obtains a mipmap level using $\log_2 P$, the obtained mipmap level may not be an integer. A specific exemplary process in this case will be described as Variation 1 with reference to FIG. 11. FIG. 11 is a flowchart showing a flow including an inverse wavelet transform process and a polygon image drawing process of Variation 1. Note that, as an example, in the following description, a mipmap level obtained by the mipmap level obtaining unit 13 is assumed to be 2.3. It is also assumed that the main memory 2 stores wavelet coefficients which have been obtained by the wavelet transform unit 12 performing transformation until the fourth order.

In step S301, the mipmap level obtaining unit 13 compares the screen coordinates of points in a polygon image and the texture coordinates of corresponding points in the original image of FIG. 2 to calculate a reduction ratio of one frame of original image of FIG. 2. The mipmap level obtaining unit 13 also obtains a mipmap level (=2.3) from the calculated reduction ratio.

Following step S301, the inverse wavelet transform unit 14 reads out only coefficients corresponding to all low-frequency component of wavelet coefficients which have an order having a value equal to the integer value (=2) of the mipmap level of the wavelet coefficients of one image block 20 stored in the main memory 2 (step S302). The inverse wavelet transform unit 14 also transforms the read wavelet coefficients until the order having the value equal to the integer value (=2) of the mipmap level using the inverse Harr wavelet transform formula (step S303). Here, in the process of step S303, the low-frequency component of third-order wavelet coefficients is calculated in addition of those of second order wavelet coefficients. The inverse wavelet transform unit 14 outputs an image represented by the low-frequency component of the second-order wavelet coefficients obtained by the inverse transformation and an image represented by the low-frequency component of the third-order wavelet coefficients obtained by the inverse transformation to the polygon drawing unit 15.

Figure 12:
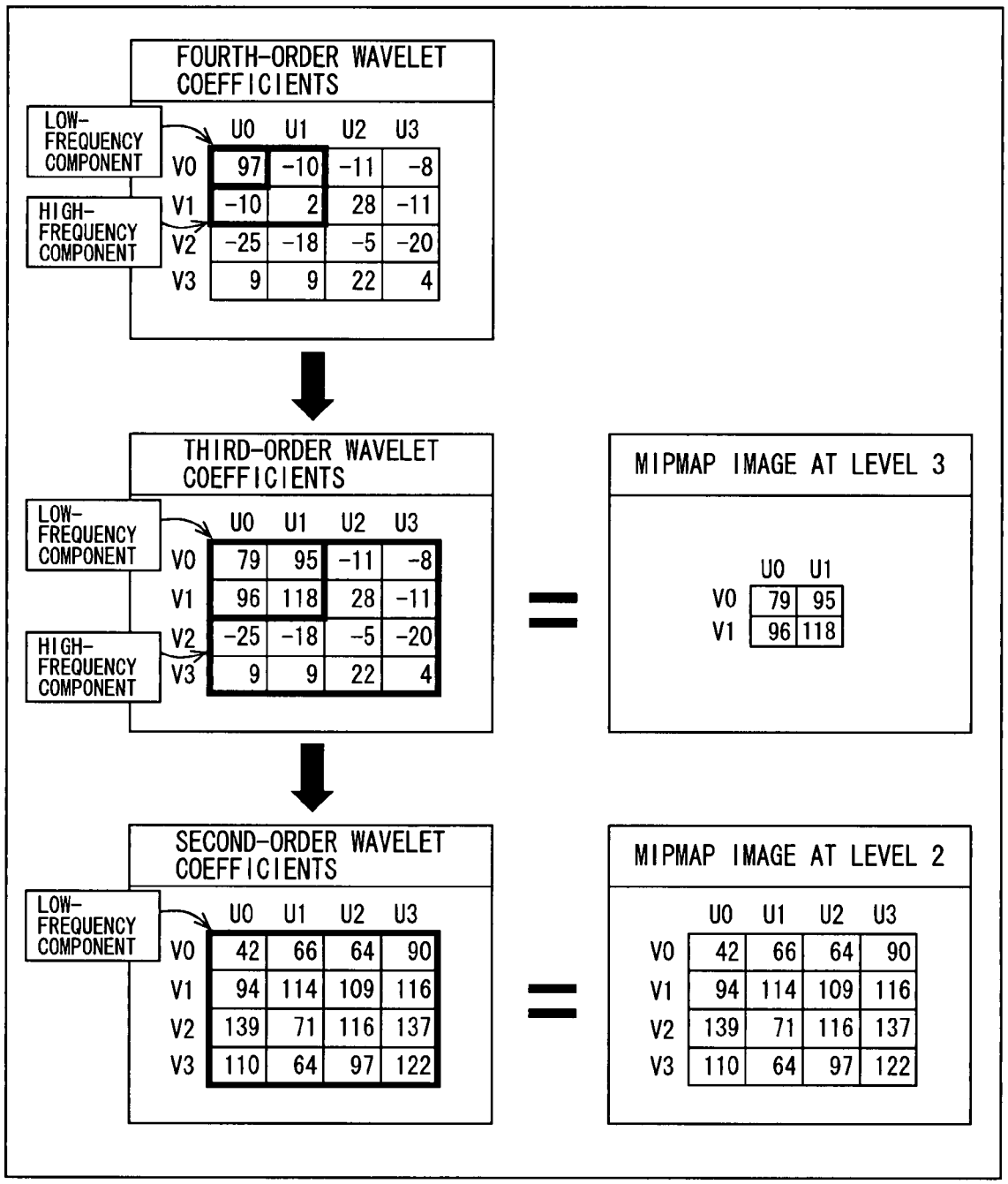
FIG. 12 is a diagram schematically showing a process of generating a mipmap image at a mipmap level of 2.3.
Figure 19:
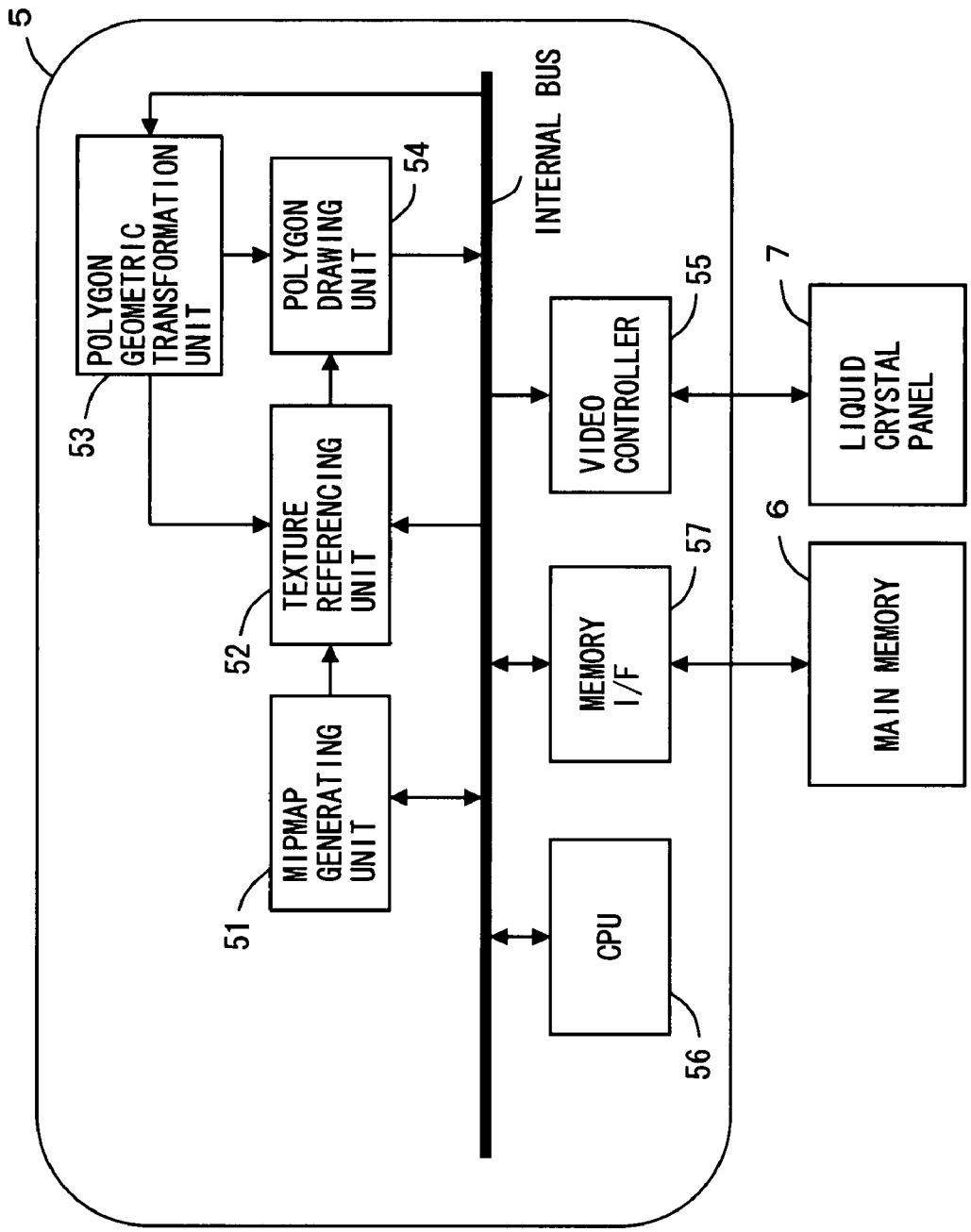
FIG. 19 is a diagram showing units constituting a conventional drawing device 5.

Hereinafter, a mechanism of calculating the low-frequency component of second- and third-order wavelet coefficients will be described with reference to FIG. 12. FIG. 12 is a diagram schematically showing a process of generating a mipmap image at a mipmap level of 2.3.

A mipmap image at the mipmap level 2 has a total of 16 pixels (four pixels in length×four pixels in width) as shown in FIG. 12. Therefore, in step S302, the inverse wavelet transform unit 14 reads out only 16 coefficients at the upper left end including fourth-order wavelet coefficients of the wavelet coefficients stored in the main memory 2. Here, as shown in FIG. 12, the fourth-order wavelet coefficients are a=(U0, V0)=97, b=(U1, V0)=−10, c=(U0, V1)=−10, and d=(U1, V1)=2. Therefore, in step S303, the inverse wavelet transform unit 14 initially calculates the luminances A to D by substituting the luminances a to d into expressions (5) to (8). The obtained luminance A is a coefficient of (U0, V0) which is a low-frequency component of the third-order wavelet coefficients. The obtained luminance B is a coefficient of (U1, V0) which is a low-frequency component of the third-order wavelet coefficients. The obtained luminance C is a coefficient of (U0, V1) which is a low-frequency component of the third-order wavelet coefficients. The obtained luminance D is a coefficient of (U1, V1) which is a low-frequency component of the third-order wavelet coefficients. Thus, by applying expressions (5) to (8) once in step S303, the low-frequency component of the third-order wavelet coefficients is calculated. An image represented by the low-frequency component of the third-order wavelet coefficients corresponds to a mipmap image at the mipmap level 3 as shown in FIG. 12. Next, by applying expressions (5) to (8) four times, the low-frequency component of the second-order wavelet coefficients is calculated from the third-order wavelet coefficients of FIG. 12. An image represented by the low-frequency component of the second-order wavelet coefficient corresponds to a mipmap image at the mipmap level 2 as shown in FIG. 12. Thus, in the process of step S303, the low-frequency component of the second- and third-order wavelet coefficients is calculated.

Following step S303, the polygon drawing unit 15 mixes, at a predetermined ratio, the image represented by the low-frequency component of the second-order wavelet coefficients (the mipmap image at the mipmap level 2) and the image represented by the low-frequency component of the third-order wavelet coefficients (the mipmap image at the mipmap level 3) (step S304). The mixture is achieved by using a known method, such as Tri-Linear or the like, which will not be described in detail. The predetermined ratio is determined, depending on, for example, the value of the fractional part of a mipmap level. When the obtained mipmap level is 2.3, the mipmap image at the mipmap level 2 and the mipmap image at the mipmap level 3 are mixed at a ratio of 7:3.

Following step S304, the polygon drawing unit 15 draws the mixed mipmap image on a polygon image (step S305). Following step S305, the polygon drawing unit 15 determines whether or not the process of drawing the original texture image of FIG. 2 has been processed until the final image block 20 (step S306). When it is determined that the drawing process has not yet been performed until the final image block 20, the process of step S302 is performed with respect to the next image block 20. When it is determined that the drawing process has been performed until the final image block 20, the flow goes to step S307. In step S307, the polygon drawing unit 15 determines whether or not the process has been performed until the final frame. When it is determined that the process has not yet been performed until the final frame, the process of step S301 is performed with respect to the next frame. When it is determined the process has been performed until the final frame, the process is ended.

As described above, according to the process of Variation 1, when a mipmap image at the mipmap level 2 and a mipmap image at the mipmap level 3 are mixed, the mipmap image at the mipmap level 3 can be automatically obtained in the process of obtaining the mipmap image at the mipmap level 2. Therefore, the mipmap image at the mipmap level 3 does not need to be separately generated. On the other hand, in the conventional inverse DCT process, a mipmap image at the mipmap level 2 and a mipmap image at the mipmap level 3 need to be separately generated. Therefore, according to the process of Variation 1, a plurality of mipmap images at different mipmap levels can be generated with higher speed than that of the conventional inverse DCT process.

Although it has been assumed above that a mipmap level which is not an integer is obtained from a calculated reduction ratio, the present invention is not limited to this. The user may directly specify a mipmap level which is not an integer with respect to the mipmap level obtaining unit 13, depending on the arrangement of a display scene. In this case, the mipmap level obtaining unit 13 obtains a mipmap level which is not an integer and is specified by the user.

(Variation 2)

In the above-described process of FIG. 7, the inverse wavelet transform unit 14 outputs an image represented by all low-frequency component of wavelet coefficients obtained by inverse transformation, as a mipmap image, to the polygon drawing unit 15 in units of image blocks 20. Alternatively, in each image block 20 of mipmap image, only a specific pixel(s) may be generated. In this case, the inverse wavelet transform unit 14 may perform an inverse transform process so as to obtain only coefficient(s) indicating the specific pixel(s) of the low-frequency component of wavelet coefficients. A specific exemplary process in this case will be described as Variation 2 with reference to FIGS. 13 to 16.

FIG. 13 is a diagram schematically showing a specific pixel A of one image block 20 of mipmap image. In the example of FIG. 13, an obtained mipmap level is 0 and the pixel A is provided in a mipmap image at the mipmap level 0. Here, the mipmap image of FIG. 13 has a mipmap level of 0 and corresponds to one image block 20. Therefore, the mipmap image of FIG. 13 corresponds to an image represented by all low-frequency component of zeroth-order wavelet coefficients. In FIG. 13, (Ux, Vy) are the coordinates of the pixel A, and x and y (x and y are integers of 0 or more) are coordinate values. FIG. 14 is a diagram schematically showing wavelet coefficients required for generation of only the pixel A. Note that, in FIG. 14, the main memory 2 is assumed to store wavelet coefficients which have been obtained by the wavelet transform unit 12 performing transformation until the fourth order. A portion (a) of FIG. 14 is a diagram showing regions b to d including the high-frequency component of first-order wavelet coefficients. A hatched portion of the portion (a) of FIG. 14 indicates the low-frequency component of the first-order wavelet coefficients. A portion (b) of FIG. 14 is a diagram showing regions b to d including the high-frequency component of second-order wavelet coefficients. A hatched portion of the portion (b) of FIG. 14 indicates the low-frequency component of the second-order wavelet coefficients. A portion (c) of FIG. 14 is a diagram showing regions b to d including the high-frequency component of third-order wavelet coefficients. A hatched portion of the portion (c) of FIG. 14 indicates the low-frequency component of third-order wavelet coefficients. A portion (d) of FIG. 14 is a diagram showing regions b to d including the high-frequency component of fourth-order wavelet coefficients. A hatched portion of the portion (d) of FIG. 14 indicates the low-frequency component of the fourth-order wavelet coefficients. A portion (e) of FIG. 14 is a diagram showing the low-frequency component of the fourth-order wavelet coefficients. FIG. 15 is a flowchart showing a flow of a process of reading out wavelet coefficients required for generation of the pixel A. FIG. 16 is a diagram showing exemplary numerical values relating to the process of FIGS. 14 and 15.

In order to generate only the pixel A, coefficients P1 to P5 shown in FIG. 14 are required. P1 is provided, one for each of the regions b to d which include the high-frequency component of the first-order wavelet coefficients. The coordinate values of P1 are the coordinate values x and y of the pixel A each divided by two. The coordinate values of P1 are (Ux/2, Vy/2) as shown in the portion (a) of FIG. 14. Note that it is assumed that, when the value obtained by division is not an integer, the value is truncated to an integer by removing the fractional part of the value. Coordinates (Ux/2, Vx/2) indicate coordinates in each of the regions b to d, assuming that the upper left endpoint has coordinates (U0, V0). A method of selecting the coordinates will be described below, indicating specific exemplary numerical values. P2 is provided, one for each of the regions b to d which include the high-frequency component of the second-order wavelet coefficients. The coordinate values of P2 are the coordinate values x and y of the pixel A each divided by 4, i.e., the coordinates of P2 are (Ux/4, Vy/4) as shown in a portion (b) of FIG. 14. Note that, when the value obtained by division is not an integer, the value is truncated to an integer by removing the fractional part of the value. The coordinates (Ux/4, Vy/4) indicate coordinates in each of the regions b to d, assuming that the upper left endpoint has coordinates (U0, V0). P3 is provided, one for each of the regions b to d which include the high-frequency component of the third-order wavelet coefficients. The coordinate values of P3 are the coordinate values x and y of the pixel A each divided by 8, i.e., the coordinates of P3 are (Ux/8, Vy/8) as shown in a portion (c) of FIG. 14. Note that, when the value obtained by division is not an integer, the value is truncated to an integer by removing the fractional part of the value. The coordinates (Ux/8, Vy/8) indicate coordinates in each of the regions b to d, assuming that the upper left endpoint has coordinates (U0, V0). P4 is provided, one for each of the regions b to d which include the high-frequency component of the fourth-order wavelet coefficients. The coordinate values of P4 are the coordinate values x and y of the pixel A each divided by 16, i.e., the coordinates of P4 are (Ux/16, Vy/16) as shown in a portion (d) of FIG. 14. Note that, when the value obtained by division is not an integer, the value is truncated to an integer by removing the fractional part of the value. The coordinates (Ux/16, Vy/16) indicate coordinates in each of the regions b to d, assuming that the upper left endpoint has coordinates (U0, V0). P5 is provided in a region a which includes the low-frequency component of the fourth-order wavelet coefficients. The coordinate values of P5 are the coordinate values x and y of the pixel A each divided by 16. The coordinates of P5 are (Ux/16, Vy/16) of a portion (e) of FIG. 14. Note that, when the value obtained by division is not an integer, the value is truncated to an integer by removing the fractional part of the value. The coordinates (Ux/16, Vy/16) indicate coordinates in the region a, assuming that the upper left endpoint has coordinates (U0, V0).

Next, a generalized flow of a process of reading out wavelet coefficients required for generation of only the pixel A will be described with reference to FIG. 15. Although it has been assumed in the description of FIG. 14 that the pixel A exists in a mipmap image at the mipmap level 0, the process of FIG. 15 is applicable to a more general case where the pixel A exists a mipmap image at a mipmap level L. If the process of FIG. 15 is performed in step S202 of FIG. 7, the inverse wavelet transform unit 14 can perform an inverse transform process so as to obtain only a portion of coefficients indicating the pixel A of the low-frequency component of wavelet coefficients. Note that, in the description of FIG. 15, the mipmap level obtained by the mipmap level obtaining unit 13 is assumed to be L. L is an integer of 0 or more. It is also assumed that the wavelet transform unit 12 performs a transform process until (L+M)th-order wavelet coefficients are obtained. M is an integer of 1 or more.

In FIG. 15, the inverse wavelet transform unit 14 adds one to the obtained mipmap level L (step S2021). Following step S2021, the inverse wavelet transform unit 14 divides each of the coordinate values x and y of the pixel A by two to calculate the coordinate (Ux/2, Vy/2) of the coefficient P1 to be read out (step S2022). Note that, when the value obtained by division is not an integer, the value is truncated to an integer by removing the fractional part of the value. Following step S2022, the inverse wavelet transform unit 14 reads out the coordinates (Ux/2, Vx/2) of the coefficient P1 from each of the regions b to d which include the high-frequency component of wavelet coefficients having an order equal to the value (L+1) obtained in step S2021 (step S2023). Following step S2023, the inverse wavelet transform unit 14 determines whether or not the order of the wavelet coefficient readout in step S2023 is equal to the highest order (L+M) indicated by the wavelet coefficients stored in the main memory 2 (step S2024). Since the current order of the wavelet coefficient read out in step S2023 is (L+1), the determination result in step S2024 is negative, and the flow goes to step S2025. In step S2025, the inverse wavelet transform unit 14 increments by one the order of the wavelet coefficient read out in step S2023 (step S2025). Since the order of the wavelet coefficient read out in step S2023 is (L+1), the process of step S2025 causes the order to be (L+2). Following step S2025, the flow goes to step S2021. In step S2021, the inverse wavelet transform unit 14 divides the coordinate values x/2 and y/2 of the coefficient P1 by two to calculate the coordinate (Ux/4, Vy/4) of the coefficient P2 to be read out.

The processes of steps S2022 to S2025 are repeated from the order (L+1) until the order (L+M). Here, m is assumed to be an integer from 1 to M. In this case, the process of repeating steps S2022 to S2025 is considered as a process of receiving only wavelet coefficients corresponding to coordinate values consisting of integer values as a result of dividing the coordinate values of the pixel A by 2 to the power of m, from the high-frequency component of (L+m) th-order wavelet coefficients, for each of the (L+1)th order to (L+M)th order.

Finally, when the order of the wavelet coefficient read out in step S2023 is equal to the highest order (L+M) (YES in step S2024), the flow goes to step S2026. In step S2026, the inverse wavelet transform unit 14 receives only a wavelet coefficient specified by coordinate values consisting of integer values as a result of dividing the coordinate values of the pixel A by 2 to the power of M, from the low-frequency component of the (L+M)th-order wavelet coefficient.

The processes of FIGS. 14 and 15 will be described in more detail with reference to the exemplary numerical values of FIG. 16. Note that, in FIG. 16, the main memory 2 is assumed to store fourth-order wavelet coefficients which have been obtained by transformation by the wavelet transform unit 12. In FIG. 16, for example, a pixel existing at (U3, V2) in a mipmap image at the mipmap level 2 is assumed to be a pixel A. In this case, the pixel A has coordinate values (x, y)=(3, 2). In this case, regarding third-order wavelet coefficients, a coefficient P required to generate only the pixel A has coordinate values (x, y)=(3/2, 2/2)=(1, 1). Therefore, the coordinates of the coefficient P are (U1, V1). The coordinates of the coefficient P indicate coordinates in each of regions b to d, assuming that the coordinates of the upper left end are (U0, V0). Specifically, in FIG. 16, (U2, V0) in the region b, (U0, V2) in the region c, and (U2, V2) in the region d are (U0, V0) for the coordinates of the coefficient P. Therefore, the coordinates of the coefficient P are (U3, V1) in the region b, (U1, V3) in the region c, and (U3, V3) in the region d. Next, regarding fourth-order wavelet coefficients, the coordinate values of a coefficient P required to generate only the pixel A are x=3/4=0 and y=2/4=0. Thus, the coordinates of the coefficient P are (U0, V0). The coordinates of the coefficient P indicate coordinates in each of the regions b to d, assuming that the coordinates of the upper left end are (U0, V0). Specifically, in FIG. 16, (U1, V0) in the region b, (U0, V1) in the region c, and (U1, V1) in the region dare (U0, V0) for the coordinates of the coefficient P. Therefore, the coordinates of the coefficient P are (U1, V0) in the region b, (U0, V1) in the region c, and (U1, V1) in the region d. In FIG. 16, the fourth order is the highest order. The coordinates of the coefficient P indicates coordinates in a region a including a low-frequency component, assuming that the upper left end has coordinates (U0, V0). In FIG. 16, (U0, V0) in the region a correspond to the coordinates of the coefficient P. Therefore, the coordinates of the coefficient P are (U0, V0). Thus, in order to generate a pixel (U3, V2), of the wavelet coefficients stored in the main memory 2, only a total of seven coefficients (U3, V1), (U1, V3), (U3, V3), (U1, V0), (U0, V1), (U1, V1) and (U0, V0) are required. Note that, for example, when the mipmap level is 2.3, a pixel at the mipmap level 3 corresponding to the pixel A is required, and in this case, the pixel at the mipmap level 3 corresponding to the pixel A of FIG. 16 is (U1, V1). This is obtained during a process of obtaining the pixel A (U3, V2) at the mipmap level 2.

Note that, if only seven coefficients shown in FIG. 16 of the coefficients including the fourth-order wavelet coefficients are used to perform a wavelet inverse transform from the four order to the second order, four coefficients are actually obtained of 16 coefficients of the low-frequency component of the second-order wavelet coefficients. Required values (U3, V2) may be selected from these four coefficients. The inverse transform process using the expressions (5) to (8) may be performed only a total of two times (including once from the fourth order to the third order and once from the third order to the second order). Thus, whereas expressions (5) to (8) are applied a total of five times in FIG. 9, they are applied only a total of two times in FIG. 16.

As described above, the inverse wavelet transform unit 14 receives only wavelet coefficients corresponding to a specific pixel from the main memory 2, and subjects only the received wavelet coefficients to an inverse transform process. Thereby, only a specific pixel(s) can be expressed. As a result, the amount of computation of the inverse transform process can be reduced by a reduction in the number of received wavelet coefficients, as compared to the case where all coefficients in a region corresponding to the low-frequency component of wavelet coefficients are received and processed.

Although it has been assumed in the process of FIG. 15 that required wavelet coefficients are read out from the main memory 2 when the order is incremented by one, the present invention is not limited to this. The wavelet coefficients stored in the main memory 2 may be read out in units of image blocks 20, and may be held in an internal memory of the inverse wavelet transform unit 14. In this case, the inverse wavelet transform unit 14 performs an inverse transform process using required wavelet coefficients from the wavelet coefficients stored in the internal memory. Also, in this case, the amount of computation of the inverse transform process can be reduced as compared to when all coefficients in a region corresponding to the low-frequency component of wavelet coefficients are received and processed.

Although it has been assumed in the process of FIG. 15 that the pixel A is drawn with respect to a plurality of image blocks 20 constituting the original texture image of FIG. 2, the present invention is not limited to this. The pixel A which exists in only any one of the image blocks 20 constituting the original texture image of FIG. 2 can be drawn. In this case, the inverse wavelet transform process and the polygon image drawing process are performed as follows. Initially, the process of step S201 of FIG. 7 is performed. Thereafter, the inverse wavelet transform unit 14 specifies an image block 20 in which the pixel A exists. Thereafter, the inverse wavelet transform unit 14 performs the process of FIG. 15 to receive only wavelet coefficients required to generate the pixel A of the wavelet coefficients in the specified image block 20. Thereafter, the inverse wavelet transform unit 14 subjects the received wavelet coefficients to an inverse transform, and outputs an image represented by a portion of the low-frequency component of the inversely transformed wavelet coefficients, as the pixel A, to the polygon drawing unit 15. Thereafter, the polygon drawing unit 15 draws the pixel A on a polygon image.

According to the drawing device of the present invention, the amount of data to be stored in a main memory is reduced, so that a required mipmap image at a mipmap level can be generated without the band congestion of a main memory connected to the drawing device and can be drawn on a polygon image, particularly even when a texture which is a moving image is used. The drawing device is also applicable to a display device or the like.

While the invention has been described in detail, the foregoing description is in all aspects illustrative and not restrictive. It is understood that numerous other modifications and variations can be devised without departing from the scope of the invention.

What is claimed is:

1. A drawing device for receiving an original image of a texture and drawing a mipmap image generated by reducing the original image on a polygon image, the drawing device comprising:

a wavelet transform unit for transforming the original image into wavelet coefficients using a Han wavelet transform formula;

a level obtaining unit for obtaining a mipmap level of the mipmap image;

an inverse wavelet transform unit for receiving and subjecting at least a portion of the wavelet coefficients obtained by the transformation by the wavelet transform unit, to an inverse transform using an inverse Han wavelet transform formula until an order having a value equal to the mipmap level is obtained, and outputting an image represented by at least a portion of a low-frequency component of wavelet coefficients having the order having the value equal to the mipmap level; and a polygon drawing unit for drawing the image output by the inverse wavelet transform unit, as a mipmap image, on the polygon image.

2. The drawing device according to claim 1, further comprising:

a decompress unit for receiving the original image divided into image blocks and compressed in units of the image blocks, each block including 2 to the power of N (N is an integer of 1 or more) pixels both in length and in width, and decompressing the original image in units of the image blocks, wherein the wavelet transform unit transforms the original image decompressed by the decompress unit into wavelet coefficients in units of the image block.

3. The drawing device according to claim 2, wherein the order of the wavelet coefficients obtained by the transformation by the wavelet transform unit has a value equal to N.

4. The drawing device according to claim 1, further comprising:

a moving image output unit for receiving a moving image formed of a plurality of the original images, and outputting the original images one by one to the wavelet transform unit.

5. The drawing device according to claim 1, wherein the inverse wavelet transform unit receives and subjects only wavelet coefficients corresponding to all the low-frequency component of the wavelet coefficients having the order having the value equal to the mipmap level, of the wavelet coefficients obtained by the transformation by the wavelet transform unit, to the inverse transform, and outputs an image represented by all the low-frequency component of the wavelet coefficients having the order having the value equal to the mipmap level.

6. The drawing device according to claim 1, wherein the inverse wavelet transform unit receives and subjects only wavelet coefficients corresponding to a portion of the low-frequency component of the wavelet coefficients having the order having the value equal to the mipmap level, of the wavelet coefficients obtained by the transformation by the wavelet transform unit, to the inverse transform, and outputs an image represented by the portion of the low-frequency component of the wavelet coefficients having the order having the value equal to the mipmap level.

7. The drawing device according to claim 6, wherein the inverse wavelet transform unit receives only a portion of wavelet coefficients having an order higher than the mipmap level of the wavelet coefficients obtained by the transformation by the wavelet transform unit.

8. The drawing device according to claim 7, wherein the mipmap level obtained in the mipmap level obtaining unit is L (L is an integer of 0 or more), the wavelet transform unit performs the transformation until the wavelet coefficients having an (L+M (M is an integer of 1 or more))th order are obtained, a position of the image represented by the portion of the low-frequency component of the wavelet coefficients is specified by predetermined coordinate values in the image represented by all the low-frequency component, the inverse wavelet transform unit receives only wavelet coefficients corresponding to coordinate values including integer values obtained by dividing the predetermined coordinate values by 2 to the power of m, from a high-frequency component of (L+m (m is an integer of 1 or more and M or less))th-order wavelet coefficients, of the wavelet coefficients obtained by the transformation by the wavelet transform unit, for each of the (L+1)th order to the (L+M)th order, and receives only a wavelet coefficient corresponding to coordinate values including integer values obtained by dividing the predetermined coordinate values by 2 to the power of M from the low-frequency component of the (L+M)th-order wavelet coefficients.

9. The drawing device according to claim 1, wherein the inverse wavelet transform unit, when the mipmap level is not an integer, subjects the received wavelet coefficients to an inverse transform until an order having a value equal to an integer value of the mipmap level is obtained, thereby outputting an image represented by at least a portion of the low-frequency component of the wavelet coefficients having the order having the value equal to the integer value and an image represented by at least a portion of the low-frequency component of the wavelet coefficients having an order higher by one than the integer value which are obtained during the inverse transform.

10. The drawing device according to claim 1, wherein the wavelet transform unit compresses a high-frequency component of the wavelet coefficients obtained by the transformation.

11. A drawing method of a drawing device for receiving an original image of a texture and drawing a mipmap image generated by reducing the original image on a polygon image, the drawing method comprising:
a wavelet transform step of the drawing device transforming the original image into wavelet coefficients using a Harr wavelet transform formula;
a level obtaining step of the drawing device obtaining a mipmap level of the mipmap image;
an inverse wavelet transform step of the drawing device receiving and subjecting at least a portion of the wavelet coefficients obtained by the transformation by the wavelet transform step, to an inverse transform using an inverse Harr wavelet transform formula until an order having a value equal to the mipmap level is obtained, and outputting an image represented by at least a portion of a low-frequency component of wavelet coefficients having the order having the value equal to the mipmap level; and
a polygon drawing step of the drawing device drawing the image output by the inverse wavelet transform step, as a mipmap image, on the polygon image.

12. A non-transitory computer-readable storage medium having stored therein a drawing program for causing a computer to implement a drawing device for receiving an original image of a texture and drawing a mipmap image generated by reducing the original image on a polygon image, the program causing the computer to execute a method comprising:
a wavelet transform step of transforming the original image into wavelet coefficients using a Han wavelet transform formula;
a level obtaining step of obtaining a mipmap level of the mipmap image;
an inverse wavelet transform step of receiving and subjecting at least a portion of the wavelet coefficients obtained by the transformation by the wavelet transform unit, to an inverse transform using an inverse Harr wavelet transform formula until an order having a value equal to the mipmap level is obtained, and outputting an image represented by at least a portion of a low-frequency component of wavelet coefficients having the order having the value equal to the mipmap level; and
a polygon drawing step of drawing the image output by the inverse wavelet transform step, as a mipmap image, on the polygon image.

13. A display device for receiving an original image of a texture and displaying a polygon image on which a mipmap image generated by reducing the original image is drawn, the display device comprising:
a wavelet transform unit for transforming the original image into wavelet coefficients using a Harr wavelet transform formula;
a storage unit for storing the wavelet coefficients obtained by the transformation by the wavelet transform unit;
a level obtaining unit for obtaining a mipmap level of the mipmap image;
an inverse wavelet transform unit for receiving and subjecting at least a portion of the wavelet coefficients from the storage unit, to an inverse transform using an inverse Han wavelet transform formula until an order having a value equal to the mipmap level is obtained, and outputting an image represented by at least a portion of a low-frequency component of wavelet coefficients having the order having the value equal to the mipmap level;
a polygon drawing unit for drawing the image output by the inverse wavelet transform unit, as a mipmap image, on the polygon image; and
a display unit for displaying the polygon image drawn by the polygon drawing unit.

14. A display method of a display device for receiving an original image of a texture and displaying a polygon image on which a mipmap image generated by reducing the original image is drawn, the display method comprising:
a wavelet transform step of the display device transforming the original image into wavelet coefficients using a Harr wavelet transform formula;
a storage step of the display device causing a storage device to store the wavelet coefficients obtained by the transformation by the wavelet transform step;
a level obtaining step of the display device obtaining a mipmap level of the mipmap image;
an inverse wavelet transform step of the display device receiving and subjecting at least a portion of the wavelet coefficients from the storage device, to an inverse transform using an inverse Harr wavelet transform formula until an order having a value equal to the mipmap level is obtained, and outputting an image represented by at least a portion of a low-frequency component of wavelet coefficients having the order having the value equal to the mipmap level;
a polygon drawing step of the display device drawing the image output by the inverse wavelet transform step, as a mipmap image, on the polygon image; and
a display step of the display device displaying the polygon image drawn by the polygon drawing step.

* * * * *